(12) United States Patent
Murakami et al.

(10) Patent No.: US 7,773,343 B2
(45) Date of Patent: Aug. 10, 2010

(54) MAGNETIC RECORDING MEDIUM, AND MANUFACTURING METHOD, MANUFACTURING APPARATUS, RECORDING AND REPRODUCTION METHOD, AND RECORDING AND REPRODUCTION APPARATUS FOR THE SAME

(75) Inventors: Motoyoshi Murakami, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1076 days.

(21) Appl. No.: 10/585,117

(22) PCT Filed: Apr. 28, 2005

(86) PCT No.: PCT/JP2005/008157
§ 371 (c)(1),
(2), (4) Date: Jun. 30, 2006

(87) PCT Pub. No.: WO2005/106869
PCT Pub. Date: Nov. 10, 2005

(65) Prior Publication Data
US 2008/0291573 A1 Nov. 27, 2008

(30) Foreign Application Priority Data
Apr. 28, 2004 (JP) .............................. 2004-133099

(51) Int. Cl.
*G11B 5/82* (2006.01)
(52) U.S. Cl. ..................................... 360/135
(58) Field of Classification Search .................. 360/135
See application file for complete search history.

(56) References Cited

U.S. PATENT DOCUMENTS

| 5,130,867 | A | * | 7/1992 | Ohashi ........................ 360/75 |
| 5,169,703 | A | * | 12/1992 | Miyazaki et al. ............ 428/141 |
| 5,191,563 | A | | 3/1993 | Lee et al. |
| 5,245,486 | A | * | 9/1993 | Hachiya et al. .......... 360/97.01 |
| 5,364,698 | A | * | 11/1994 | Kotani ........................ 428/323 |
| 5,500,296 | A | * | 3/1996 | Inoue et al. ................. 428/408 |
| 5,887,336 | A | * | 3/1999 | Watanabe ................ 29/603.16 |
| 6,087,004 | A | * | 7/2000 | Tanaka et al. ............... 428/403 |
| 6,146,740 | A | * | 11/2000 | Birukawa et al. ........... 428/141 |
| 6,399,174 | B1 | | 6/2002 | Shiratori et al. |

(Continued)

FOREIGN PATENT DOCUMENTS

EP  0 405 741  1/1991

(Continued)

OTHER PUBLICATIONS

Supplementary European Search Report issued Oct. 24, 2008 in the Application No. EP 05 73 6973.

*Primary Examiner*—Allen T Cao
(74) *Attorney, Agent, or Firm*—Wenderoth, Lind & Ponack, L.L.P.

(57) ABSTRACT

With a magnetic recording medium, servo pits have to be recorded one disk at a time, which is a problem in that it takes more time and is more expensive. In view of this, with the present invention, at least one signal region whose surface roughness is different from that of other than the signal region is formed on the substrate of a magnetic recording medium comprising a recording layer on a substrate, or on an under layer formed on a substrate.

21 Claims, 11 Drawing Sheets

U.S. PATENT DOCUMENTS

| | | |
|---|---|---|
| 6,490,117 B1 | 12/2002 | Sacks et al. |
| 6,565,763 B1 | 5/2003 | Asakawa et al. |
| 6,587,290 B2 | 7/2003 | Ishida et al. |
| 6,602,620 B1 | 8/2003 | Kikitsu et al. |
| 6,961,196 B2 | 11/2005 | Ishida et al. |
| 2002/0098387 A1 | 7/2002 | Tsubata et al. |
| 2002/0132083 A1 | 9/2002 | Weller et al. |
| 2003/0076612 A1 | 4/2003 | Sacks et al. |
| 2004/0071924 A1 | 4/2004 | Yang et al. |
| 2005/0052957 A1 | 3/2005 | Kamimura et al. |
| 2006/0024531 A1* | 2/2006 | Murakami ................... 428/827 |
| 2006/0124585 A1* | 6/2006 | Suwa et al. ................... 216/22 |

FOREIGN PATENT DOCUMENTS

| | | |
|---|---|---|
| EP | 1 227 472 | 7/2002 |
| JP | 1-229439 | 9/1989 |
| JP | 5-266523 | 10/1993 |
| JP | 6-176405 | 6/1994 |
| JP | 6-290496 | 10/1994 |
| JP | 8-7355 | 1/1996 |
| JP | 8-203058 | 8/1996 |
| JP | 11-213420 | 8/1999 |
| JP | 2001-176004 | 6/2001 |
| JP | 3323743 | 6/2002 |
| WO | 00/58954 | 10/2000 |
| WO | 03/090222 | 10/2003 |

* cited by examiner

MAGNETIC RECORDING MEDIUM, AND MANUFACTURING METHOD, MANUFACTURING APPARATUS, RECORDING AND REPRODUCTION METHOD, AND RECORDING AND REPRODUCTION APPARATUS FOR THE SAME

TECHNICAL FIELD

The present invention relates to a rewritable magnetic recording medium, or to a magnetic recording medium with which signals are recording and reproduced while the recording medium is irradiated with light which raises its temperature, and more particularly a magnetic recording medium having a servo reference signal, and to a manufacturing method, manufacturing apparatus, recording and reproduction method, and recording and reproduction apparatus involving this magnetic recording medium.

BACKGROUND ART

Magnetic recording media, and optical recording media such as phase-change recording media, are portable recording media that allow large capacities of information to be recorded at high density, and as the trend toward multimedia has continued in recent years, there has been a surge in demand for media with which large-capacity computer files or moving pictures can be recorded.

An optical recording medium generally has a structure in which a multilayer thin film such as a recording film that includes a recording layer is formed on a transparent, disk-shaped substrate made of plastic or the like. This optical recording medium is irradiated with a laser, a focusing servo and guide grooves or pre-pits are used to record and erase information while applying a tracking servo, and the reflected laser light is used to reproduce information.

Conventional magnetic recording media have mainly been what is known as optical modulation recording systems, in which information that has been recorded by adding a static magnetic field is erased, after which new information is recorded by adding a static magnetic field in the opposite direction. More recently, however, attention has shifted to magnetic field modulation systems because they make possible recording in a single rotation (direct overwrite) and allow accurate recording even at high density levels. Also, phase-change optical recording media have been gaining popularity because they afford direct overwrite by employing optical modulation recording and allow reproduction with the same optical system as a CD or DVD.

The recording density limit of an optical recording medium is determined by the laser wavelength ($\lambda$) of the light source, and is a function of the diffraction limit ($\approx\lambda/(2NA)$; where NA is the numerical aperture of the objective lens). In recent years a system has been proposed in which a NA of 0.8 or higher is attained by using a set of two objective lenses, and these systems have undergone considerable development. The laser used for recording and reproduction is directed through the substrate at a recording film that includes a recording layer, but as the NA increases, aberration caused by tilt of the substrate and so forth increases when light passes through the substrate, so the substrate has to be made thinner.

Also, with a magnetic recording medium, higher density recording than with optical recording media has been achieved by the development of practical magnetic recording heads (such as GMR heads) and improvements to the medium, but because there are no guide grooves or pre-pits for the tracking servo as there are with an optical recording medium, a tracking signal has to be prerecorded with a servo writer or the like.

A method for forming servo pits by magnetic transfer, for example, has been proposed as a way to solve the above problem (see Patent Document 1, for example).

Patent Document 1: Japanese Unexamined Patent Publication H10-40544

DISCLOSURE OF THE INVENTION

With the above-mentioned conventional magnetic recording media, however, since a tracking signal is prerecorded by a servo writer or the like, a servo reference signal has to be recorded for every single medium, which takes more time and drives up the cost. Also, with the method proposed in the above-mentioned Patent Document 1, problems were encountered with the transfer magnetic field, the working method, and so forth. Furthermore, with all of these methods, when the tracking pitch was small because of increased recording capacity (recording density), the surrounding environment, such as temperature drift, had a greater effect, which made it difficult to form and detect a stable servo reference signal or to record stable tracking information.

It is an object of the present invention to solve the above problems encountered with a recording medium that performs recording and reproduction magnetically, and provide a magnetic recording medium with superior signal characteristics and tracking characteristics. Another object is to provide a magnetic recording medium that has superior signal characteristics and improved stability of the servo reference signal even with a recording medium that magnetically records and reproduces while being irradiated with light that raises the temperature of the recording film including a recording layer.

A magnetic recording medium of the present invention having a recording layer on a substrate comprises at least one signal region on the substrate, wherein a surface roughness of the signal region is different from that of other than the signal region.

This eliminates the need to record a tracking-use servo reference signal for every single medium, and therefore improves productivity and lowers cost.

The magnetic recording medium comprises a recording layer on a substrate, wherein said magnetic recording medium is equipped with a under layer on the substrate, there is at least one signal region on the under layer, and the surface roughness of the signal region is different from that of other regions.

With the magnetic recording medium of the present invention, it is preferable if the under layer is composed of a dielectric layer, a metal layer, a magnetic layer, or a thin film laminated thereof.

This eliminates the need to record a tracking-use servo reference signal for every single medium, and therefore improves productivity and lowers cost.

With the magnetic recording medium of the present invention, it is preferable if the signal region has a concave or convex shape.

With the magnetic recording medium of the present invention, it is preferable if microparticles are packed in the signal region.

These afford a greater change in magnetic characteristics and enhance the stability of the servo reference signal, which improves the signal characteristics of the magnetic recording medium.

With the magnetic recording medium of the present invention, it is preferable if the signal region comprises pre-pits having a surface roughness Ra of 0.5 nm or more, and the surface roughness of the other than the signal region is constant and less than 0.5 nm.

With the magnetic recording medium of the present invention, it is preferable if the recording layer is composed of a magnetic film having magnetic anisotropy in the direction perpendicular to the film plane.

With the magnetic recording medium of the present invention, it is preferable if a reproduction layer, to which a recording magnetic domain formed on the recording layer is transferred, and to which the magnetic wall of the transferred recording magnetic domain moves during the reproduction of recorded information, is further provided over the recording layer.

This allows a recording and reproduction system of higher density to be accommodated.

With the magnetic recording medium of the present invention, it is preferable if the signal region has pre-pits that serve as a reference for a tracking servo of a recording and reproduction magnetic head.

With the magnetic recording medium of the present invention, it is preferable if the pre-pits that serve as a reference for the tracking servo of the recording and reproduction magnetic head have a concave/convex pattern that is smaller than the smallest pattern in the recording magnetic domain formed in the recording layer.

These eliminate the need for a servo writer or the like to be used to record a servo reference signal, and afford a magnetic recording medium with superior signal characteristics and stable servo characteristics.

With the magnetic recording medium of the present invention, it is preferable if the maximum diameter of the signal region is 0.5 μm or less.

The method of the present invention for manufacturing a magnetic recording medium is a method for manufacturing a magnetic recording medium having a recording layer on a substrate, comprises, forming at least one signal region by etching on the substrate such that the surface roughness of the signal region is different from the surface roughness of the other than the signal region.

With the method of the present invention for manufacturing a magnetic recording medium, it is preferable if the surface roughness of the magnetic recording medium is increased by etching.

With the method of the present invention for manufacturing a magnetic recording medium, it is preferable if the surface roughness of the magnetic recording medium is smoothed by etching.

With the method of the present invention for manufacturing a magnetic recording medium, it is preferable if the recording layer surface is smoothed by etching after forming the recording layer.

The method of the present invention for manufacturing a magnetic recording medium, comprises, forming pre-pits on a stamper by etching the stamper surface, and forming the signal region whose surface roughness is different from that of the other than the signal region by transferring the pre-pits onto the substrate.

With the method of the present invention for manufacturing a magnetic recording medium, it is preferable if the etching is performed after first coating the etching surface with microparticles.

With the method of the present invention for manufacturing a magnetic recording medium, it is preferable if the etching is ion etching, plasma etching, or another such type of dry etching.

With the method of the present invention for manufacturing a magnetic recording medium, the transfer is performed by imprinting.

With the method of the present invention for manufacturing a magnetic recording medium, the transfer is performed by heating.

With the method of the present invention for manufacturing a magnetic recording medium, the pre-pits formed in the stamper are transferred onto a resin formed on the substrate.

The method of the present invention for manufacturing a magnetic recording medium, comprises, forming a servo signal on the magnetic recording medium using the signal region as a reference signal.

With these manufacturing methods, a magnetic recording medium having superior signal characteristics can be manufactured even with recording and reproducing at high density.

The apparatus of the present invention for manufacturing a magnetic recording medium having a recording layer on a substrate, comprises, a recording layer formation component for forming on a substrate a recording layer composed of a magnetic film having magnetic anisotropy in the direction perpendicular to the film plane, and a region formation component for forming at least one signal region on a substrate by etching, such that the surface roughness of that signal region is different from that of the other than the signal region.

The method of the present invention for recording to a magnetic recording medium having a recording layer on a substrate, comprises, detecting a difference in magnetic characteristics from a difference in surface roughness, forming a servo reference signal on the basis of the difference in magnetic characteristics, and recording an information signal to the magnetic recording medium by irradiating with a laser beam while applying a tracking servo.

The method of the present invention is a method for reproducing from a magnetic recording medium having a recording layer on a substrate, comprises, forming a servo reference signal while raising the temperature of the recording layer by irradiating the magnetic recording medium with a laser beam, and reproducing an information signal from the magnetic recording medium by irradiating with a laser beam while applying a tracking servo.

The recording and reproduction apparatus of the present invention for recording to and reproducing from a magnetic recording medium having a recording layer on a substrate, comprises, a magnetic head for recording and reproducing an information signal to or from a magnetic recording medium by irradiating with a laser beam, an optical head for irradiating the magnetic recording medium with a laser beam during the reproduction of the information signal, a magnetic head control and detection component for controlling the magnetic head and detecting a difference in magnetic characteristics from a difference in surface roughness; a spindle motor for rotating the magnetic recording medium, and a motor drive and control circuit for controlling the rotation and drive of the spindle motor and controlling the tracking servo of the magnetic recording medium and a laser beam.

The magnetic recording medium of the present invention is not limited to the above constitutions, and may be any magnetic recording medium having a constitution that allows a servo reference signal to be formed by utilizing a difference in magnetic characteristics resulting from a difference in surface roughness, as well as a manufacturing method, recording and reproduction method, and recording and reproduction apparatus involving the use of this magnetic recording medium.

With the magnetic recording medium of the present invention as discussed above, with a constitution in which a signal region whose surface roughness is different from that of other than the signal region is formed over a substrate or over an under layer formed over a substrate, the productivity of the medium is improved and the cost reduced, and a magnetic recording medium having superior servo characteristics is obtained.

Also, if the signal region consists of a concave or convex pattern, then the resulting magnetic recording medium will have improved stability and reliability of the servo reference signal even when information is magnetically recorded or reproduced while the medium is irradiated with light which raises the temperature of the recording film including a recording layer.

Because of the above, it is possible to provide a magnetic recording medium that has superior signal characteristics even when performing high-density recording and reproduction.

Figure 1:
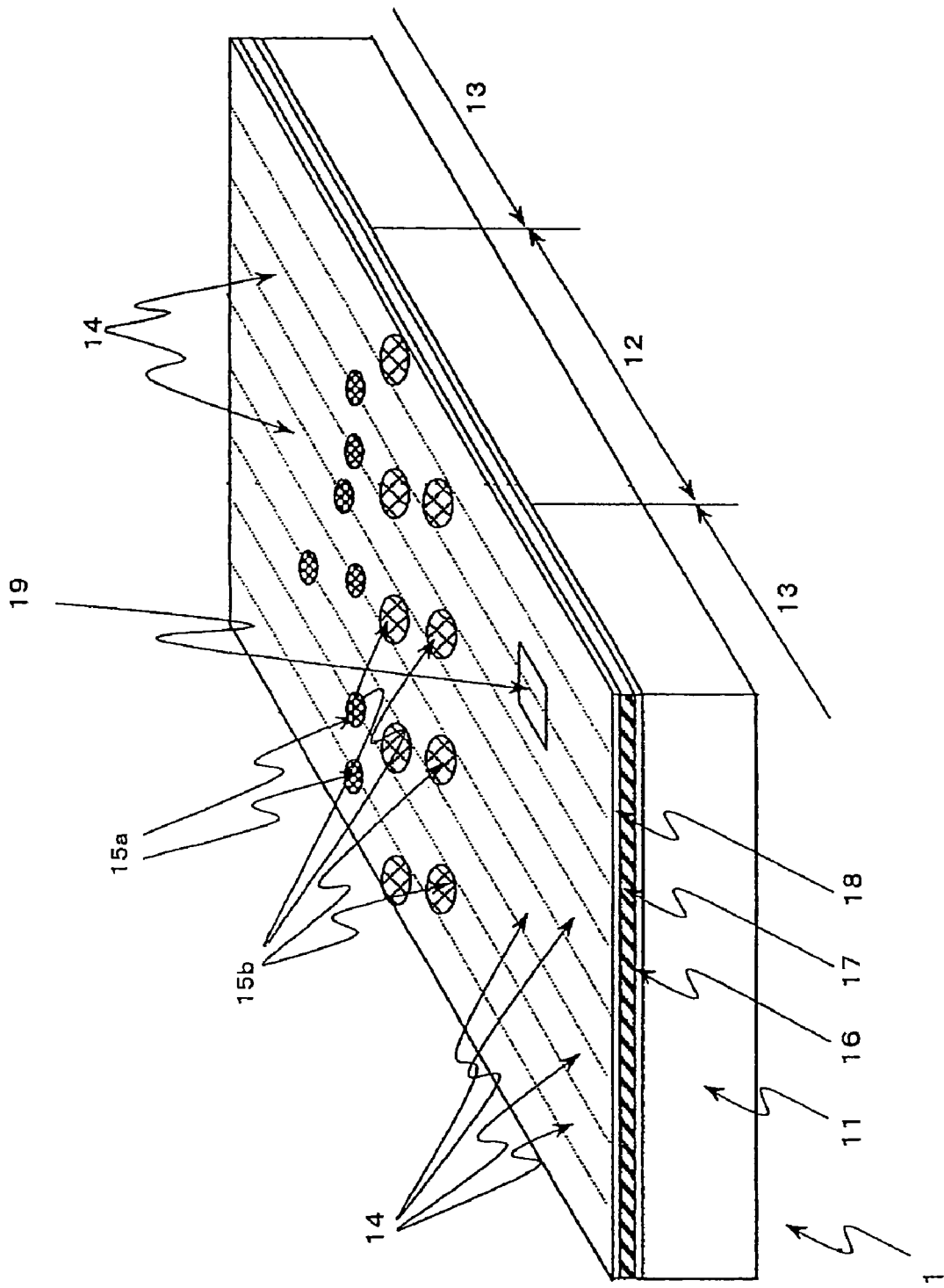
FIG. 1 is a diagram of the structure of the magnetic recording medium in Embodiment 1 of the present invention.

NUMERICAL REFERENCE 1, 2, 3, 4, 5, 6, 201 magnetic recording medium
11, 21, 41, 51, 61 substrate
12, 22, 32, 42, 52, 62 pit region
13, 23, 33, 43, 53, 63 data region
16, 26, 36, 46, 56, 66 dielectric layer
17, 27, 37, 47, 57, 67 recording film
18, 28, 38, 48, 58, 68 lubricating protective layer
19, 29, 39, 49, 59, 69 magnetic head
30, 40, 60, 70 laser beam
50 microparticles
80 stamper
202 magnetic head
203 spindle motor
204 optical head
205 laser drive circuit
206 magnetic head control and detection circuit
207 motor drive and control circuit

BEST MODE FOR CARRYING OUT THE INVENTION

The present invention will now be described in detail through reference to the drawings, but the present invention is not limited to the following embodiments to the extent that the gist thereof is not exceeded.

In the following embodiments, the surface roughness Ra is expressed by the following formula, and is a value obtained by averaging the total of the absolute values $|f(X,Y)|$ of the deviation from the average plane to the measurement point in the surface area of the measurement surface $(X \times Y)$, expressed by the following formula.

$$Ra = \frac{1}{X \times Y} \int\int_{X,Y} |f(X,Y)| dX dY \qquad \text{(Formula 1)}$$

In this embodiment, measurement is performed using approximately 1 μm² as a reference for the area of the measurement plane.

Embodiment 1

To record a servo signal for a tracking servo on a conventional magnetic recording medium (hereinafter referred to as a magnetic disk), a servo reference signal had to be recorded for every single medium with a servo writer or the like, which took more time and drove up the cost. Also, when the recording density was raised, precise positional control was difficult, particularly in the tracking direction. Another problem was that positional fluctuations in the radial direction accompanying changes in environment temperature, the recording track correlation between the servo writer and the actual recording and reproduction apparatus, and other such factors caused deterioration in the recording and reproduction signal characteristics or decreased in the reproduction signal quantity.

Figure 10:
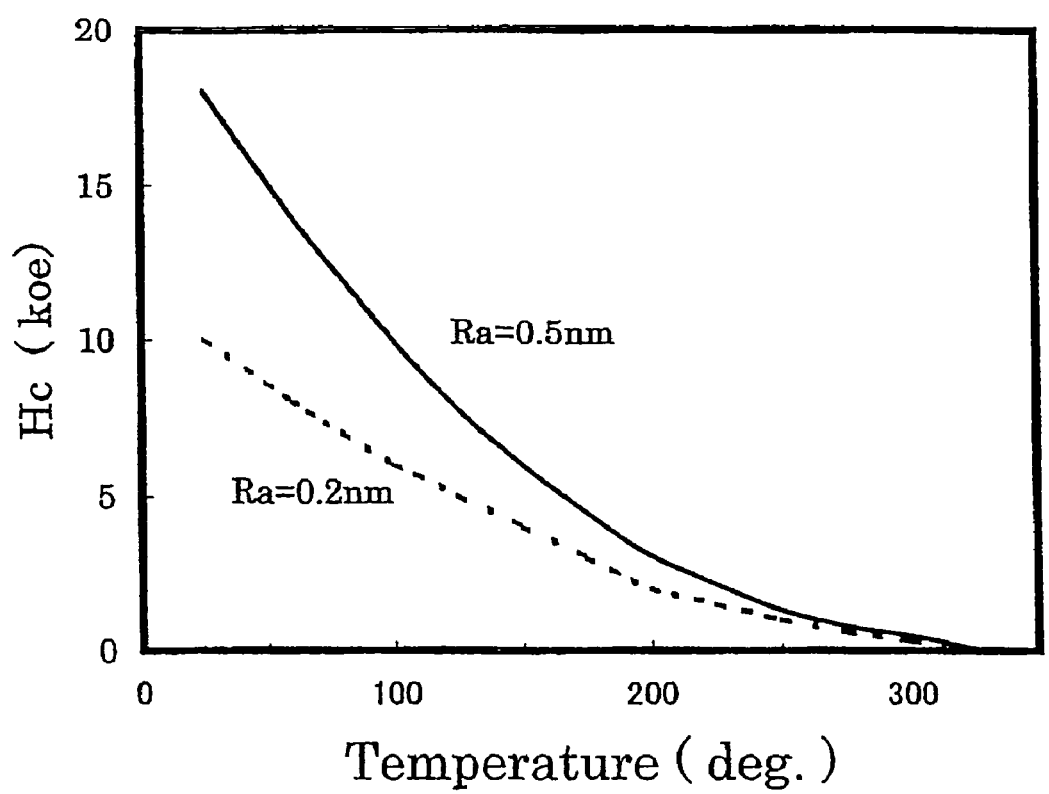
FIG. 10 is a graph of the difference in magnetic characteristics produced by a difference in surface roughness.

In contrast, with the magnetic disk 1 in Embodiment 1 of the present invention, servo-use pre-pits (signal region) formed by varying the surface roughness from that of other than the signal region are provided on a substrate, so there is no need to record a servo signal using a servo writer or the like. Also, since position information that serves as a reference is accurately recorded in the servo pre-pits, even if the environment temperature or the like should vary, recording and reproduction can be performed using the servo pre-pits as a reference, so stability is excellent with respect to temperature changes, and a magnetic disk with superior signal characteristics can be obtained. FIG. 10 shows an example of the relationship between environment temperature change and coercive force Hc, in which the surface roughness Ra is 0.5 or 0.2 nm. Since a different surface roughness results in a different coercive force Hc, this is an effective way to vary the surface roughness in order to solve the above-mentioned problem.

FIG. 1 shows the structure of the magnetic disk 1 in Embodiment 1 of the present invention.

11 is a transparent substrate composed of glass, 16 is a dielectric layer (under layer), 17 is a recording film (magnetic layer), and 18 is a lubricating protective film that protects the recording film and also serves as a lubricating layer for sliding a magnetic head 19. 14 is a recording track, which is constituted by servo-use pit regions 12 and information recording-use data regions 13. In the pit regions 12 are formed tracking servo-use pre-pits 15a and address detection-use pre-pits 15b, which are two kinds of servo-use pre-pits formed by changing the surface roughness to be different from that of the pit regions 12. The track pitch of the magnetic disk 1 is 0.3 µm.

With the above-mentioned magnetic disk 1, the recording film 17 is irradiated with a laser beam from the side on which the lubricating protective film 18 is formed, and signals are recorded and reproduced by the magnetic head 19 (such as a GMR head). This is applicable to the recording and reproduction of recording marks of a magnetic disk recorded at high density. During the recording of information, the magnetic disk 1 rotates, and a recording signal modulated along with an information signal is modulated by the magnetic head 19 and recorded as recording marks on the magnetic disk 1. During the reproduction of a recorded signal, the magnetic flux is detected by the magnetic head 19 from the recorded magnetic domains of the recording marks to effect reproduction.

The method for producing the magnetic disk 1 will now be described in detail.

First, the substrate 11 composed of transparent glass is heated and melted, and a stamper having a pit pattern formed by etching is pressed onto the molten glass to thermally transfer the pattern, forming pre-pits having a surface roughness Ra of 0.5 nm or more. The surface roughness of the stamper used for thermal transfer here is controlled by ion etching.

Next, a silicon target is placed in a DC magnetron sputtering apparatus, and the substrate 11 on which the pre-pits have been formed is fixed to a substrate holder, after which the chamber is vacuum evacuated with a turbo molecular pump until a high vacuum of $8\times10^{-6}$ Pa or less is attained. While this vacuum evacuation is continued, argon gas and $N_2$ gas are introduced into the chamber until a pressure of 0.3 Pa is reached, and the dielectric layer 16 (an under layer composed of SiN) is formed in a thickness of 5 nm by reactive sputtering while the substrate 11 is rotated.

More argon gas is introduced into the chamber until 1.5 Pa is reached, and the recording film 17 (a magnetic layer of TbFeCo) is formed in a thickness of 40 nm by DC magnetron sputtering, using targets of terbium, iron, and cobalt, while the substrate 11 is rotated. The TbFeCo film composition here can be adjusted as desired by adjusting the ratio in which power is applied to the targets. The recording film 17 composed of TbFeCo here was produced by setting the power applied to each of the targets so that the compensation composition temperature would be 120° C. and the Curie temperature would be 310° C. The coercive force at room temperature here was 8 kOe or less. Also, recorded magnetic domains can be formed stably even when tiny magnetic domains are recorded by the magnetic head 19, and recording and reproduction with excellent signal characteristics can be accomplished even in the case of repeatedly conducting recording and reproduction with the magnetic head 19.

A solid protective layer composed of diamond-like carbon is formed over the recording film 17 in a thickness of 5 nm by reactive RF sputtering using a carbon target in a mixed atmosphere of argon and $CH_4$. A lubricating protective film 18 is formed over this by coating with a perfluoropolyether.

The magnetic disk 1 was described above as having a structure in which the recording film 17 was formed over the substrate 11, whose pit pattern had been thermally transferred by heating and melting, but a method in which a glass substrate is directly worked instead of performing thermal transfer, or a method involving imprinting or the like may be used, for example.

Furthermore, the track pitch of the magnetic disk 1 was given as 0.3 µm, but the effect of the present invention is greater with a magnetic disk in which information is recorded to a recording domain in which the width of the recording track (where information is recorded) is 0.6 µm or less, and the shortest mark length of recorded information is 0.3 µm or less.

As discussed above, with the constitution of this embodiment, stable signal characteristics are obtained even when information is recorded and reproduced at high density. Furthermore, since the recorded magnetic domains in the information track are formed in a stable shape, there is a reduction in crosswrite and crosstalk from adjacent tracks during recording and reproduction.

Embodiment 2

A problem encountered with a conventional disk was that when the recording film was irradiated with a laser beam, the servo characteristics fluctuated or deteriorated as the temperature of the magnetic disk rose. Another problem was that the recording and reproduction characteristics suffered when the servo signal fluctuated.

In contrast, with the magnetic disk 2 of this Embodiment 2, servo-use pre-pits (signal regions) formed by varying the surface roughness so as to be different from other than the signal region are formed over a dielectric layer (under layer), and the change in the magnetic characteristics of the recording film are detected as a servo reference signal, so the servo characteristics remain stable with respect to changes in the environment temperature, or changes in the temperature of the magnetic disk when the recording film is irradiated with a laser beam during recording and reproduction. As a result, even if the light beam or the like raises the temperature of the recording film, and a signal is reproduced using a magnetic head (such as a GMR head), a magnetic disk can still be obtained with excellent heat resistance and signal characteristics.

Figure 2:
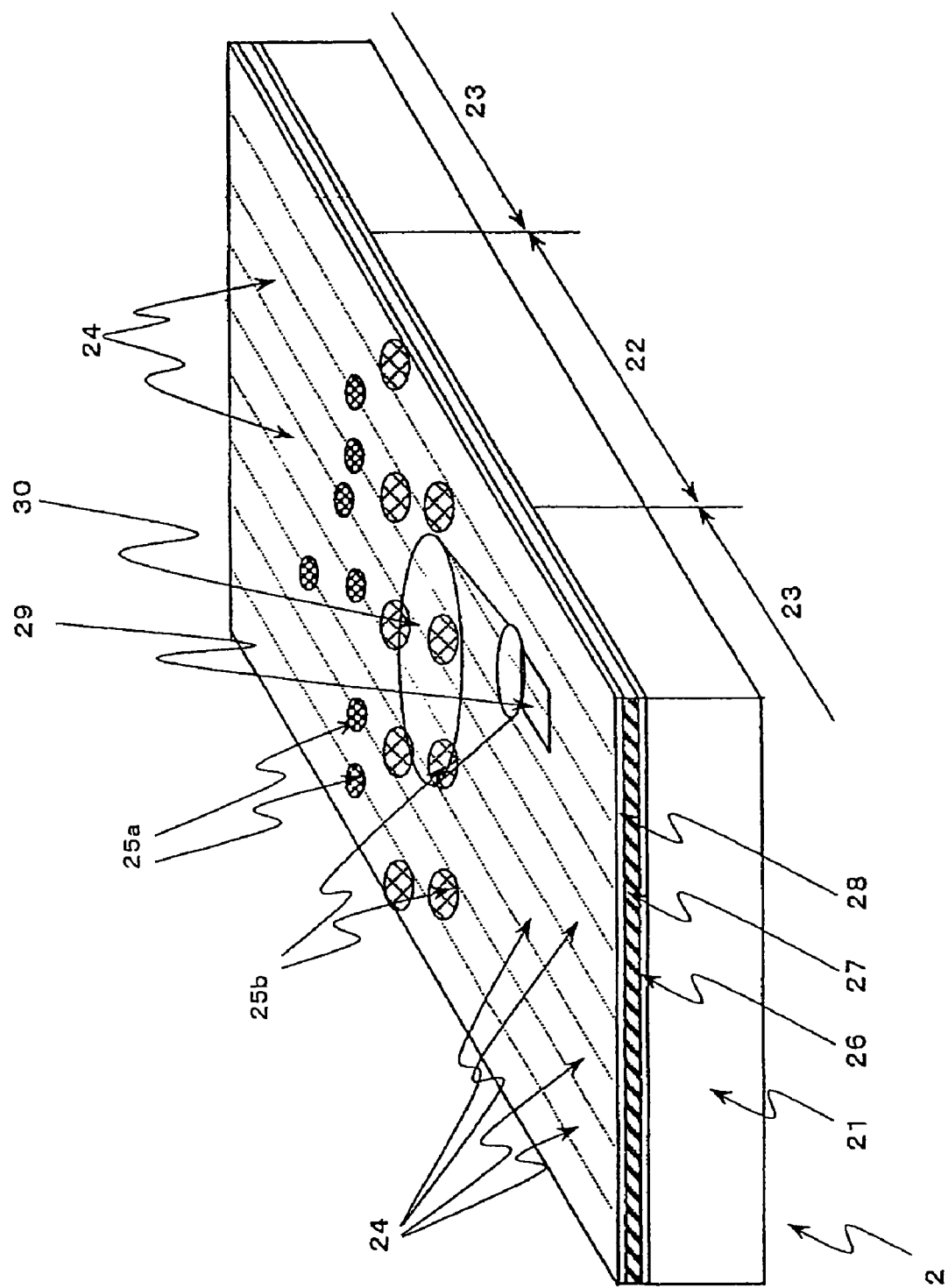
FIG. 2 is a diagram of the structure of the magnetic recording medium in Embodiment 2 of the present invention.

FIG. 2 shows the structure of a magnetic disk 2 in Embodiment 2 of the present invention.

21 is a substrate composed of a metal material, 26 is a dielectric layer (under layer), 27 is a recording film (magnetic layer group), and 28 is a lubricating protective film that protects the recording film and also serves as a lubricating layer for sliding a magnetic head 29. The magnetic head 29 has an objective lens (not shown) for irradiating the magnetic disk 2 with a laser beam 30. 24 is a recording track, which is constituted by servo-use pit regions 22 and information recording-use data regions 23. In the pit regions 22 are formed tracking servo-use pre-pits 25a and address detection-use pre-pits 25b, which are two kinds of servo-use pre-pits formed by changing the surface roughness to be different from that of the pit regions 22. The track pitch of the magnetic disk 2 is 0.25 µm.

With the above-mentioned magnetic disk 2, the recording film 27 is irradiated with a laser beam from the side on which the lubricating protective film 28 is formed, and signals are recorded and reproduced by the magnetic head 29. This is applicable to a magnetic disk that needs to be capable of the recording and reproduction of recording marks that are beyond the detection limit during laser spot reproduction.

The recording film 27 of this Embodiment 2 will now be described in detail.

The recording film 27 is composed of a laminated magnetic layer group. This magnetic layer group is made up of the multilayer film shown in FIG. 9. This multilayer film has a recording layer 113 in which recording information is kept, a reproduction layer 111 for detecting recording information from the movement of the magnetic wall, and an intermediate switching layer (hereinafter referred to as "intermediate layer") 112 for controlling the alternating coupling of the reproduction layer 111 and the recording layer 113.

With the magnetic disk 2 shown in FIG. 2, the magnetic wall of the recorded information transferred from the recording layer 113, through the intermediate layer 112, and to the reproduction layer 111 is successively shifted toward the temperature gradient produced by the light beam. DWDD (Magnetic Domain Wall Displacement Detection), in which this shifting of the magnetic wall is detected with a magnetic head, which enhances the detection sensitivity of the magnetic head during reproduction and affords magnetically super-resolution reproduction, can be applied to a magnetic disk.

The above-mentioned laminated recording film 27 is an example of a DWDD system which is a method for increasing signal volume and the amplitude of the reproduced signal by utilizing the shift in the magnetic wall. Here, a magnetic film having a large interface saturated coercive force is used for the recording layer, a magnetic film having a small interface saturated coercive force is used for the reproduction layer, and a magnetic film having a relatively low Curie temperature is used for the intermediate layer for switching transfer between magnetic films. Therefore, the recording film 27 is not limited to this film configuration, and may make use of any magnetic layer to which the DWDD technology can be applied.

Figure 9:
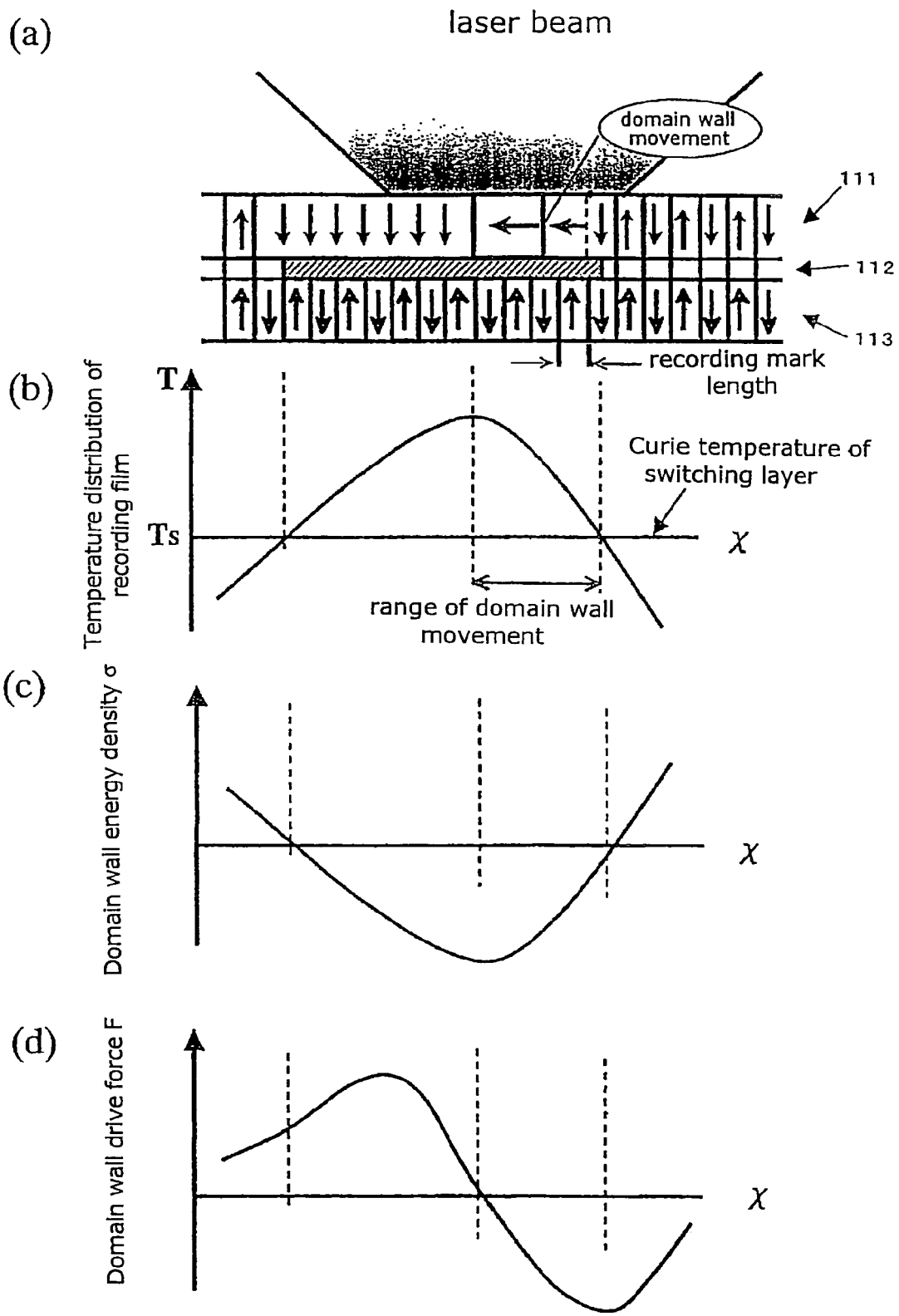
FIG. 9 illustrates the operation of reproducing information from a magnetic recording medium in an embodiment of the present invention, in which: (a) is a cross section of the structure of the recording film of the magnetic recording medium (and particularly the direction of magnetization), (b) is a graph of the temperature distribution inside the medium versus the position of the magnetic recording medium during the reproduction operation, (c) is a graph of the magnetic wall energy density of the reproduction layer, and (d) is a graph of the force that attempts to move the magnetic wall of the reproduction layer.

The reproduction principle of the above-mentioned DWDD technology will now be described through reference to FIG. 9.

FIG. 9a is a cross section of the recording film 27 of a rotating magnetic disk. This film has a three-layer structure consisting of the reproduction layer 111, the intermediate layer 112, and the recording layer 113, provided over a substrate and a dielectric layer.

The reproduction layer 111 is made up of a magnetic thin film material having a small magnetic wall coercivity, the intermediate layer 112 is made up of a magnetic film having a low Curie temperature, and the recording layer 113 is made up of a magnetic film that allows the recorded magnetic domains to be held even with a small domain diameter. Here, the reproduction layer has a magnetic domain structure including magnetic walls that are not closed, which is the result of forming a guard band or the like that separates the recording tracks.

As shown in the drawing, an information signal is formed as a recording magnetic domain that is thermo-magnetically recorded in the recording layer 113. With the recording film 27 at room temperature and not irradiated with a laser spot, the recording layer 113, the intermediate layer 112, and the reproduction layer 111 are alternately coupled together firmly, so the recorded magnetic domains of the recording layer 113 are transferred and formed onto the reproduction layer 111 as they are.

FIG. 9b is a graph of the relationship between a position $\chi$ corresponding to the cross section of FIG. 9a and the temperature T of the recording film 27. During the reproduction of a recorded signal, the magnetic disk rotates so that it is irradiated with a laser spot along the recording track. At this time, the recording film 27 exhibits the temperature distribution shown in FIG. 9b, which includes a temperature region Ts in which the intermediate layer 112 is at the Curie temperature Tc or higher, and the alternate coupling of the reproduction layer 111 and the recording layer 113 is cut off.

Also, upon irradiation with the reproduction beam, there is a gradient of magnetic wall energy density $\sigma$ in the direction of $\chi$, which is the magnetic disk rotation direction corresponding to the position in FIGS. 9a and 9b, as indicated by the dependence on magnetic wall energy density $\sigma$ shown in FIG. 9c, so a force F that drives the magnetic walls acts on the magnetic walls of each layer at the position $\chi$. This driving force F acting on the recording film 27 shifts the magnetic walls toward lower magnetic wall energy density $\sigma$ as shown in the drawing. Since the reproduction layer 111 has low magnetic wall coercivity and high magnetic wall mobility, this driving force F shifts the magnetic walls easily with the reproduction layer 111 alone, if the magnetic walls are not closed. Therefore, as shown by the arrows, the magnetic walls of the reproduction layer 111 instantaneously shift to a region with a higher temperature and with a lower magnetic wall energy density. Then, when the magnetic walls pass through the reproduction beam spot, the magnetization of the reproduction layer 111 within the spot is aligned in the same direction over a wider region of the spot. As a result, regardless of the size of the recorded magnetic domains, the size of the reproduction magnetic domains always has a fixed maximum amplitude. Accordingly, even when a signal is reproduced using a magnetic head such as a GMR head, the temperature of the recording film 27 is increased by the light beam or the like, so the transferred magnetic domains in the reproduction layer 111 can be expanded, resulting in a signal volume with a fixed maximum amplitude.

With this magnetic disk 2, during the recording of information, the magnetic disk 2 rotates and information is recorded by the magnetic head while the disk is irradiated with a laser beam spot along the track. Since the coercive force of the recording layer 113 decreases at high temperature here, recording with a magnetic head is possible. Also, during signal reproduction, the temperature is raised by irradiation with the laser beam, while the transferred magnetic domains are expanded by the shifting of the magnetic walls using the above-mentioned DWDD technology, while the reproduction magnetic domains are detected by a magnetic head such as a GMR head. Here, if the constitution is such that the temperature and the saturation magnetization Ms of the reproduction layer both rise together, then the reproduction signal is at its maximum during temperature elevation, so the detection sensitivity of the magnetic head will increase and the reproduction signal will be larger.

Next, the method for producing the magnetic disk 2 will be described in detail.

First, a substrate 21 composed of metal is used as a mask, and the masked surface is etched with an ion gun to form pre-pits with a surface roughness Ra of at least 0.8 nm.

Next, an AlTi target is placed in a DC magnetron sputtering apparatus, and the substrate is fixed to a substrate holder, after which the apparatus is vacuum evacuated with a turbo molecular pump until a high vacuum of $8 \times 10^{-6}$ Pa or less is attained. While this vacuum evacuation is continued, argon gas is introduced into the chamber until a pressure of 0.4 Pa is reached, and a metal under layer composed of AlTi is formed in a thickness of 4 nm while the substrate is rotated. Then, argon gas and $N_2$ gas are introduced and a dielectric layer 26 (an AlTiN film) is formed in a thickness of 5 nm by reactive sputtering. As a result, servo-use pre-pits are formed in which the surface roughness Ra of the dielectric layer is at least 0.6 nm.

Then, with the vacuum evacuation continued, argon gas is introduced into the chamber up to 1.8 Pa, and a recording layer 113 of TbFeCo is formed in a thickness of 60 nm by DC magnetron sputtering, using an alloy target of TbFeCo, while the substrate is rotated. The recording layer 113 composed of TbFeCo here was produced by adjusting the film composition so that the compensation composition temperature would be −150° C. and the Curie temperature would be 310° C. As a result, film characteristics can be obtained such that the coercive force Hc of the recording layer 113 decreases as the temperature rises from room temperature, so the coercive force is low at elevated temperatures, and recording with a magnetic head is possible. Also, in this embodiment, a signal is reproduced by DWDD technology involving a temperature gradient in the midst of irradiation with a light beam, but the reproduction layer 111 reaches its maximum saturation magnetization Ms at 90° C., so an effect of increasing the reproduction signal is obtained.

Next, the vacuum chamber is moved while the vacuum evacuation is continued, argon gas is introduced into the chamber up to 2.0 Pa, and the intermediate layer 112 of TbFeCoCr is formed in a thickness of 20 nm by DC magnetron sputtering, using an alloy target of TbFeCoCr, while the substrate is rotated. Then, the vacuum chamber is moved again while the vacuum evacuation is continued, argon gas is introduced into the chamber up to 0.8 Pa, and the reproduction layer 111 of GdFeCoCr is formed in a thickness of 30 nm by DC magnetron sputtering, using an alloy target of GdFeCoCr, while the substrate is rotated. The TbFeCo, TbFeCoCr, and GdFeCo film compositions here can be adjusted as desired by adjusting the alloy target compositional ratios and the film formation conditions.

Then, argon gas and $N_2$ gas are introduced into the chamber up to 0.3 Pa, and a dielectric layer composed of SiN is formed in a thickness of 4 nm by reactive sputtering while the substrate is rotated. A solid layer composed of diamond-like carbon is then formed over this in a thickness of 3 nm by reactive RF sputtering using a carbon target in a mixed atmosphere of argon and $CH_4$. A lubricating protective film 28 is formed over this by coating with a perfluoropolyether.

The magnetic disk 2 was described above as having a structure in which the substrate surface was worked directly by etching, but it is also possible to use a method in which pre-pits are formed by a photopolymer, or a method involving imprinting or the like, or a method in which a base surface over the substrate is directly etched and direct pre-pit working is performed.

Furthermore, the track pitch of the magnetic disk 2 was given as 0.25 μm, but the effect of the present invention is greater with a magnetic disk in which the information is recorded to a recording domain in which the width of the groove (where information is recorded) is 0.6 μm or less, and the shortest mark length of recorded information is 0.3 μm or less.

As discussed above, with the constitution of this embodiment, stable reproduction signal characteristics are obtained even when high-density recorded information is recorded and reproduced. Furthermore, since the recorded magnetic domains in the information track are formed in a stable shape, there is a reduction in crosswrite and crosstalk from adjacent tracks during recording and reproduction.

Embodiment 3

A problem encountered with a conventional recording disk was that a servo writer or the like had to be used to record a servo signal for every single magnetic disk in order to record a servo signal for a tracking servo, which took more time and drove up the cost. Also, when the recording density was raised, precise positional control was difficult, particularly in the tracking direction. Another problem was fluctuations or deterioration in the servo characteristics accompanying a rise in magnetic disk temperature during irradiation of the recording film with a laser beam, fluctuations in environment temperature, the recording track correlation between the servo writer and the actual recording and reproduction apparatus, and other such factors. Particular problems were crosstalk and crosswrite, deterioration of the recording and reproduction signals, and a decrease in the reproduction signal volume.

In contrast, with the magnetic disk of this embodiment, the magnetic disk configuration is such that servo-use pre-pits (signal region) formed by varying the surface roughness from that of other than the signal region are provided on a substrate, so a magnetic disk, and a method for manufacturing this disk, with which there is no need to record a servo signal using a servo writer or the like can be realized. Also, since position information that serves as a reference is accurately recorded on the disk, even if the environment temperature or the like should vary, recording and reproduction can be performed using the servo pre-pits, which have different magnetic characteristics, as a reference, so stability is excellent with respect to temperature changes, and a magnetic disk with superior signal characteristics can be obtained.

Figure 3:
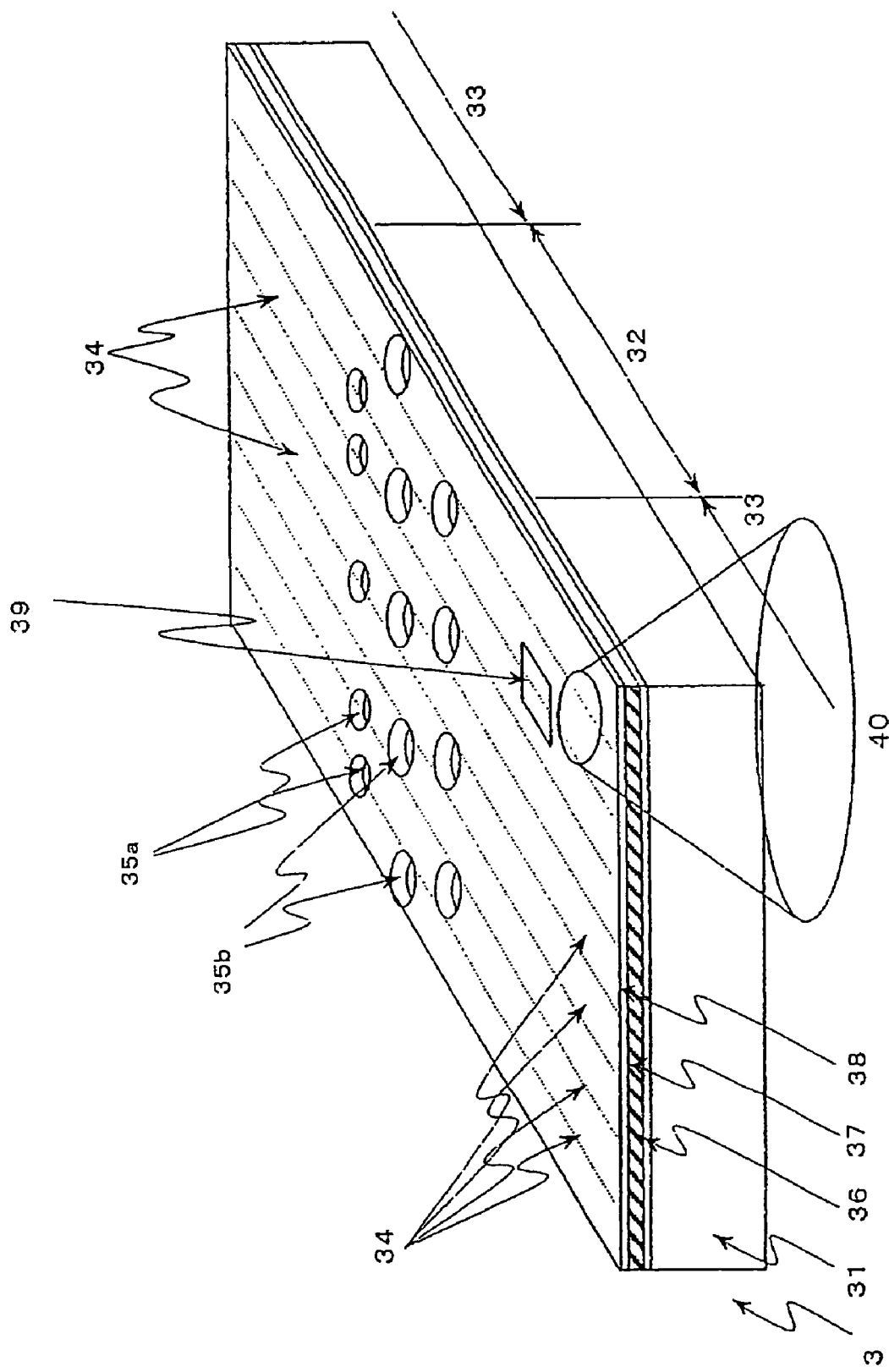
FIG. 3 is a diagram of the structure of the magnetic recording medium in Embodiment 3 of the present invention.

FIG. 3 shows the structure of the magnetic disk 3 in Embodiment 3 of the present invention.

31 is a transparent substrate composed of glass, 36 is a dielectric layer (under layer), 37 is a recording film (magnetic layer group), and 38 is a lubricating protective film that protects the recording film and also serves as a lubricating layer for sliding a magnetic head 39. 34 is a recording track, which is constituted by servo-use pit regions 32 and information recording-use data regions 33. In the pit regions 32 are formed tracking servo-use pre-pits 35*a* and address detection-use pre-pits 35*b*, which are two kinds of servo-use pre-pits formed by changing the surface roughness to be different from that of the pit regions 32. The pre-pits 35*a* and 35*b* are both concave in shape. The track pitch of the magnetic disk 3 of this embodiment is 0.35 μm.

With the above-mentioned magnetic disk 3, the recording film is irradiated with a laser beam 40 from the substrate 31 side, and signals are recorded and reproduced to and from the recording film 37 by the magnetic head 39 (such as a GMR head) from the side on which the lubricating protective film 38 is formed. This is applicable to the recording and reproduction of recording marks of a magnetic disk recorded at high density. The characteristics of the recording film 37 are such that as its temperature T rises, its coercive force Hc drops and its saturation magnetization Ms increases. During the recording of information, the magnetic disk 3 rotates and is irradiated with a laser spot along the track by the magnetic head 39. Since the coercive force of the recording film 37 decreases at high temperature here, recording with the magnetic head is possible. During signal reproduction, the temperature is raised by irradiated with the laser beam, while the recorded magnetic domains are detected by the magnetic head (such as a GMR head). Here, the saturation magnetization Ms rises along with temperature, reaching its maximum at 70° C., so the detection sensitivity of the magnetic head is enhanced and the reproduction signal is increased.

Next, the method for producing the magnetic disk 3 will be described in detail.

Figure 7:
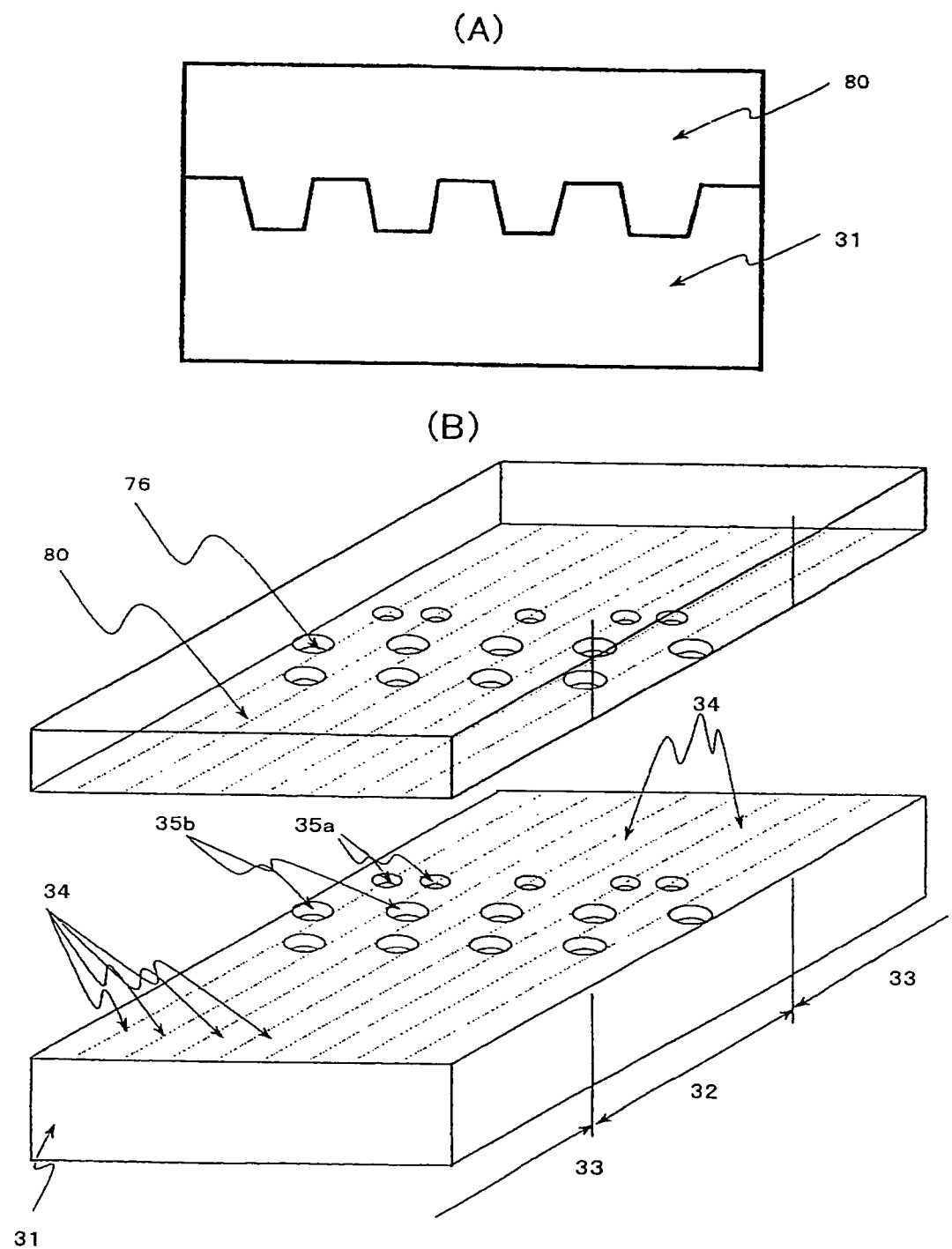
FIG. 7A is a cross section and FIG. 7B is an oblique perspective view, both illustrating the method for manufacturing a magnetic recording medium in an embodiment of the present invention.

First, the stamper 80 shown in FIG. 7 is used to produce the substrate 31. A pit pattern 76 used for imprinting is formed on the stamper 80 using a photoresist, and the surface roughness of the bottom side of the pit pattern 76 is controlled by ion etching.

Next, the stamper 80 is pressed against the substrate 31, which is made of glass, to transfer the pit pattern 76 and form pre-pits 35a and 35b having a concave shape and a surface roughness Ra of 0.5 nm or more on the substrate 31. This step also forms pit regions 32 and data regions 33 in the recording track 34 of the substrate 31.

Next, an AlTi target is placed in a DC magnetron sputtering apparatus, and the substrate 31 in which the concave pre-pits 35a and 35b have been formed is fixed to a substrate holder, after which the chamber is vacuum evacuated with a turbo molecular pump until a high vacuum of $8 \times 10^{-6}$ Pa or less is attained. While this vacuum evacuation is continued, argon gas and $N_2$ gas are introduced into the chamber until a pressure of 0.3 Pa is reached, and a dielectric layer 36 (an under layer composed of AlTiN) is formed in a thickness of 7 m by reactive sputtering while the substrate is rotated.

Figure 11:
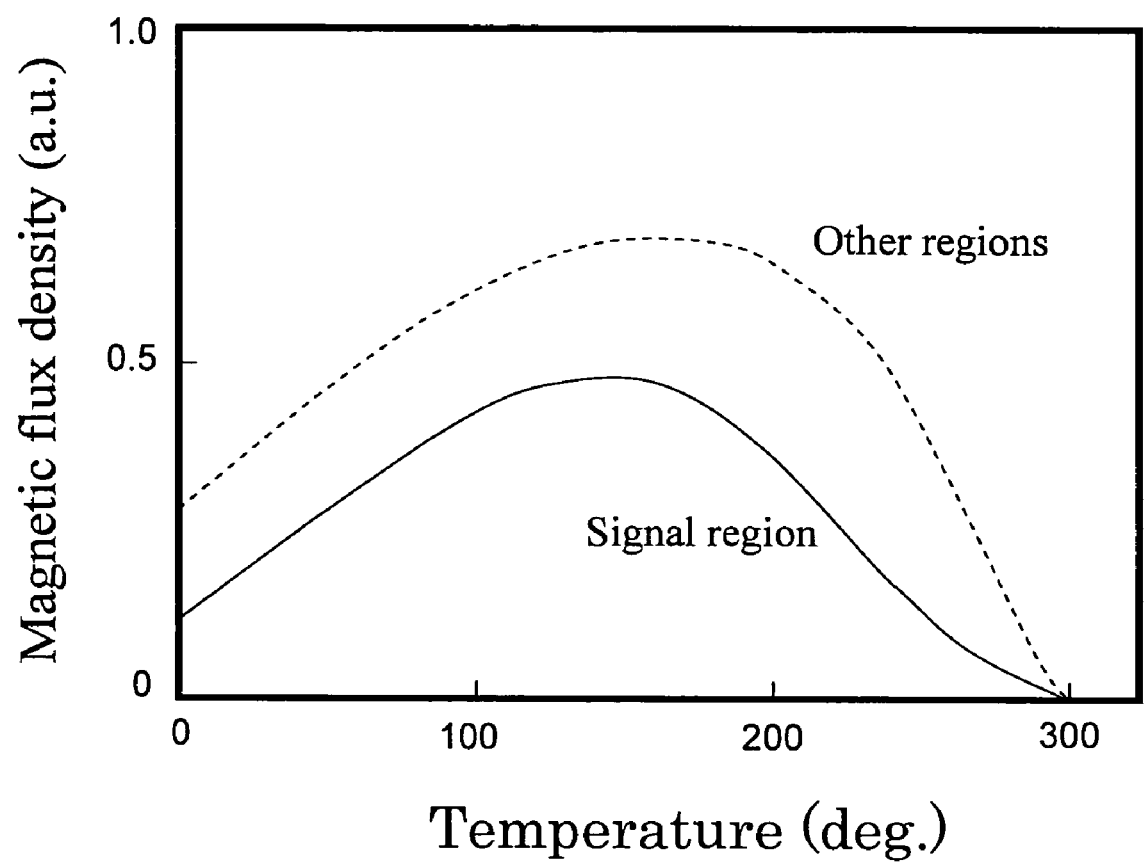
FIG. 11 is a graph of the temperature characteristics of magnetic flux density produced by the position of a magnetic head.

Then, argon gas is introduced into the chamber up to 1.5 Pa, and a recording layer 37 (magnetic layer) of TbFeCo is formed in a thickness of 50 nm by DC magnetron sputtering, using targets of terbium, iron, and cobalt, while the substrate 31 is rotated. The TbFeCo film composition here can be adjusted as desired by adjusting the ratio in which power is applied to the targets. The recording film 37 composed of TbFeCo here was produced by setting the power applied to each of the targets so that the compensation composition temperature would be −130° C. and the Curie temperature would be 320° C. The coercive force at room temperature here was 6 kOe or less. Also, recorded magnetic domains can be formed stably even when tiny magnetic domains are recorded by the magnetic head 39, and recording and reproduction with excellent signal characteristics can be accomplished even in the case of repeatedly conducting recording and reproduction with the magnetic head 39. Here, in FIG. 11, a graph of the temperature characteristics is shown, describing magnetic flux density in the signal region and other than the signal region produced by the position of a magnetic head. An information signal can be recorded and reproduced by detecting and recording change of magnetic flux density shown in FIG. 11 as a servo reference signal.

A solid protective layer composed of diamond-like carbon is formed over the recording film 37 in a thickness of 4 nm by reactive RF sputtering using a carbon target in a mixed atmosphere of argon and $CH_4$. A lubricating protective film 38 is formed over this by coating with a perfluoropolyether.

The magnetic disk 3 was described above as having a structure in which the recording film 37 was formed over a substrate having pre-pits formed by imprinting such that the surface roughness thereof would be different from that of other than the signal region, but a method in which a glass substrate is directly worked, a transfer method involving heating and melting, or a method involving transfer by a photopolymer may also be used, for example.

Furthermore, the track pitch of the magnetic disk 3 was given as 0.35 μm, but the effect of the present invention is greater with a magnetic disk in which information is recorded to a recording domain in which the width of the recording track (where information is recorded) is 0.6 μm or less, and the shortest mark length of recorded information is 0.35 μm or less.

As discussed above, with the constitution of this embodiment, stable reproduction signal characteristics are obtained even when information is recorded and reproduced at high density. Furthermore, since the recorded magnetic domains in the information track are formed in a stable shape, there is a reduction in crosswrite and crosstalk from adjacent tracks during recording and reproduction.

Embodiment 4

A problem encountered with a conventional magnetic disk was that a servo writer or the like had to be used to record a servo signal for every single magnetic disk in order to record a servo signal for a tracking servo, which took more time and drove up the cost. Also, when the recording density was raised, positional control was difficult, particularly in the tracking direction. Another problem was fluctuations or deterioration in the servo characteristics accompanying a rise in magnetic disk temperature during irradiation of the recording film with a laser beam, fluctuations in environment temperature, the recording track correlation between the servo writer and the actual recording and reproduction apparatus, and other such factors. Particular problems were radial position fluctuations and so forth, crosstalk and crosswrite, deterioration of the recording and reproduction signals, and a decrease in the reproduction signal volume.

In contrast, the magnetic disk 4 configuration is such that servo-use pre-pits (signal region) formed so that the surface roughness is different from that of other than the signal region are provided on a substrate, so a magnetic disk, and a method for manufacturing this disk, with which there is no need to record a servo signal using a servo writer can be realized. Also, since position information that serves as a reference is accurately recorded on the disk, even if the environment temperature or the like should vary, recording and reproduction can be performed using the servo pre-pits, which have different magnetic characteristics, as a reference, so stability is excellent with respect to temperature changes, and a magnetic disk with superior signal characteristics can be obtained.

Figure 4:
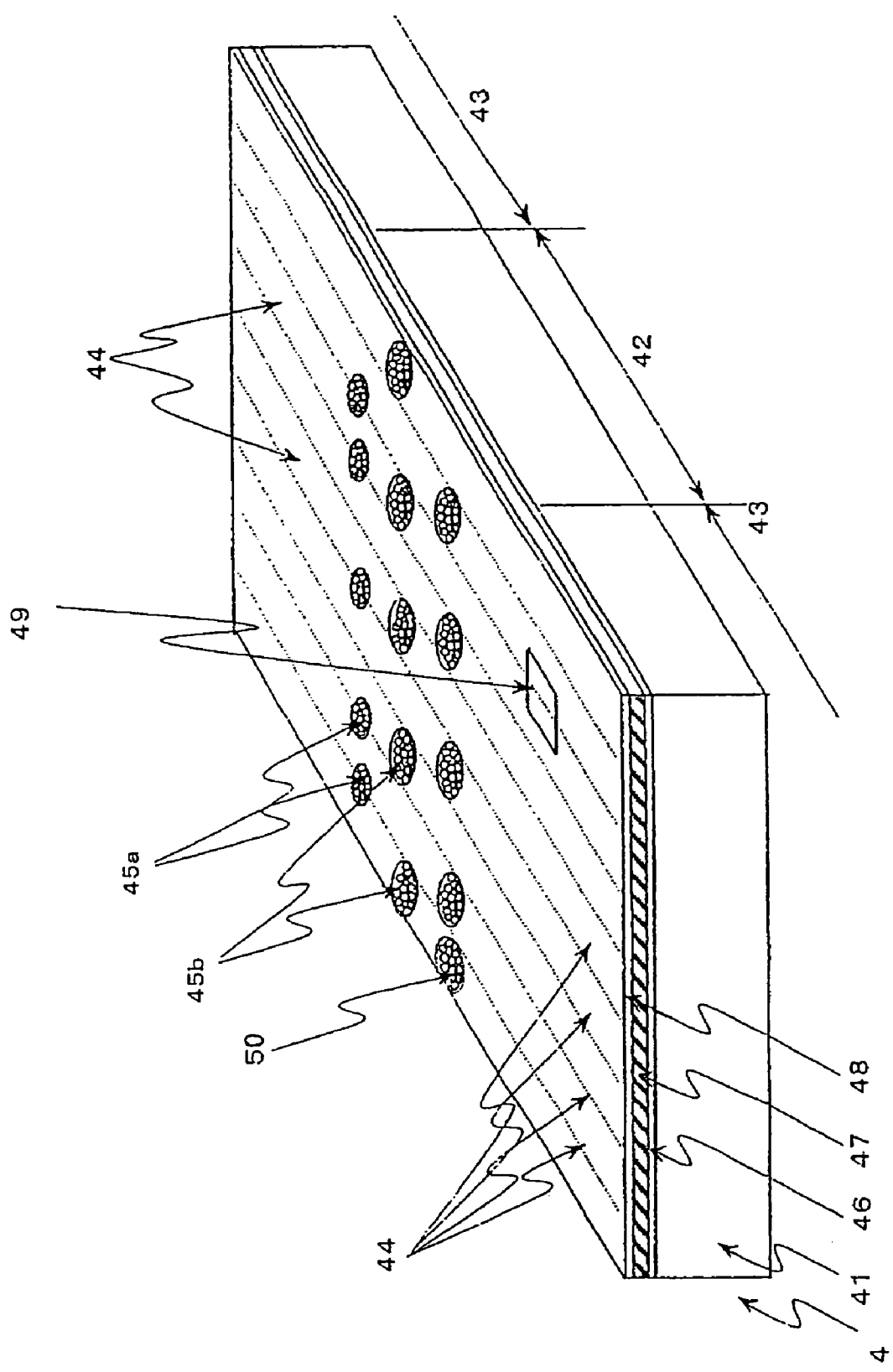
FIG. 4 is a diagram of the structure of the magnetic recording medium in Embodiment 4 of the present invention.

FIG. 4 shows the structure of the magnetic disk 4 in Embodiment 4 of the present invention.

41 is a transparent substrate composed of glass, 46 is a dielectric layer (under layer), 47 is a recording film (magnetic layer group), and 48 is a lubricating protective film that protects the recording film and also serves as a lubricating layer for sliding a magnetic head 49. 44 is a recording track, which is constituted by servo-use pit regions 42 and information recording-use data regions 43. In the pit regions 42 are formed tracking servo-use pre-pits 45a and address detection-use pre-pits 45b, which are two kinds of servo-use pre-pits formed by changing the surface roughness to be different from that of the pit regions 42. The pre-pits 45a and 45b are both concave in shape. The track pitch of the magnetic disk 4 of this embodiment is 0.4 μm, and the pre-pit diameter is 0.35 μm.

With the above-mentioned magnetic disk 4, signals are recorded and reproduced to and from the recording film 47 by the magnetic head 49 from the side on which the lubricating protective film 48 is formed. This is applicable to the recording and reproduction of recording marks of a magnetic disk recorded at high density. Also, the recording and reproduction of recording marks beyond the detection limit during the reproduction of the laser spot is possible. During the recording of information, the magnetic disk 4 rotates and recording is performed by the magnetic head 49. Since the coercive force of the recording film 47 decreases to 8 kOe here, recording with the magnetic head 49 is possible. During signal reproduction, the magnetic flux from the recorded magnetic domains is detected by the magnetic head (such as a GMR head). Here, the saturation magnetization Ms rises along with temperature, and if the composition is adjusted so that the maximum is reached at 60° C., the detection sensitivity of the magnetic head is enhanced and the reproduction signal is increased.

Next, the method for producing the magnetic disk 4 will be described in detail.

First, to form the substrate 41, a stamper in which pit regions and data regions have been formed in the recording track is used, just as in Embodiment 3 shown in FIG. 7. Pre-pits used for imprinting are formed on the stamper using a photoresist.

Next, just as above, the stamper is pressed against the substrate, which is made of glass, to transfer the pit pattern and form pre-pits having a surface roughness Ra of 0.5 nm or more on the substrate 41. This step also forms pit regions 42 and data regions 43 in the recording track 44 of the substrate 41.

Next, the insides of the concave pre-pits 45a and 45b are coated with microparticles 50 of a self-organizing organic substance. With this constitution, the surface shape inside the pre-pits 45a and 45b is different from that of other portions, and the magnetic characteristics of the recording film 47 can be varied by means of the difference in the surface roughness Ra. (See FIGS. 10 and 11, and Embodiments 1 and 3.)

After this, the substrate 41 is fixed to a substrate holder in a DC magnetron sputtering apparatus, and then the chamber is vacuum evacuated with a turbo molecular pump until a high vacuum of $8 \times 10^{-6}$ Pa or less is attained. While this vacuum evacuation is continued, argon gas and $O_2$ gas are introduced into the chamber until a pressure of 0.3 Pa is reached, and a dielectric layer 46 (an under layer composed of TaO) is formed in a thickness of 10 nm by reactive sputtering, using a tantalum target, while the substrate is rotated.

Then, while vacuum evacuation is continued, argon gas is introduced into the chamber up to 1.5 Pa, and a recording layer 47 of TbFeCo is formed in a thickness of 60 nm by DC magnetron sputtering, using an alloy target of TbFeCo, while the substrate 41 is rotated. The TbFeCo film composition here can be adjusted as desired by adjusting the ratio in which power is applied to the alloy target. The recording film 47 composed of TbFeCo here was produced by adjusting the film composition by setting the conditions and the target composition so that the compensation composition temperature would be 180° C. and the Curie temperature would be 330° C. This composition resulted in a coercive force at room temperature of 6 kOe or less. Also, recorded magnetic domains can be formed stably even when tiny magnetic domains are recorded by the magnetic head 49, and recording and reproduction with excellent signal characteristics can be accomplished even in the case of repeatedly conducting recording and reproduction with the magnetic head 49.

A solid protective layer composed of diamond-like carbon is formed over the recording film 47 in a thickness of 3 nm by reactive RF sputtering using a carbon target in a mixed atmosphere of argon and $CH_4$. A lubricating protective film 48 is formed over this by coating with a perfluoropolyether.

The magnetic disk 4 was described above as having a structure in which the recording film 47 was formed over a substrate 41 having pre-pits formed such that the surface roughness would be different from that of other than the signal region because of self-organizing microparticles, but a method in which a glass substrate is directly worked, a transfer method involving heating and melting, or a method involving transfer by a photopolymer may also be used, for example. Also, if etching or the like is performed after the pre-pits have been coated with the microparticles, the surface roughness can be easily changed, and the effect of the present invention is more pronounced.

As to the microparticles, the same effect is obtained as long as their diameter is less than 0.2 μm and they have uniform characteristics.

It is also possible to form a plurality of regions (in the desired number) having different surface roughness by employing a coating step or etching step.

Furthermore, the track pitch of the magnetic disk 4 was given as 0.4 μm, but the effect of the present invention is greater with a magnetic disk in which information is recorded to a recording domain in which the width of the recording track (where information is recorded) is 0.6 μm or less, and the shortest mark length of recorded information is 0.3 μm or less.

As discussed above, with the constitution of this embodiment, stable reproduction signal characteristics are obtained even when information is recorded and reproduced at high density. Furthermore, since the recorded magnetic domains in the information track are formed in a stable shape, there is a reduction in crosswrite and crosstalk from adjacent tracks during recording and reproduction.

Embodiment 5

A problem encountered with a conventional magnetic disk was that the servo characteristics fluctuated or deteriorated as the temperature of the magnetic disk rose when the recording film was irradiated with a laser beam. Or, there was a problem in that the recording and reproduction characteristics were adversely affected as the servo signal fluctuated, for example.

In contrast, the magnetic disk 5 configuration is such that servo-use pre-pits (signal region) formed so that the surface roughness is different from that of other than the signal region are formed on the under layer, and the change in magnetic characteristics of the recording layer is detected as a servo reference signal, so the resulting servo characteristics is stable with respect to changes in the environment temperature, and changes in the temperature of the magnetic disk when the recording film is irradiated with the laser beam during recording and reproduction. As a result, a magnetic disk with superior signal characteristics and superior durability can be obtained even when a signal is reproduced using a magnetic head such as a GMR head by raising the temperature of the recording film with a light beam or the like.

Figure 5:
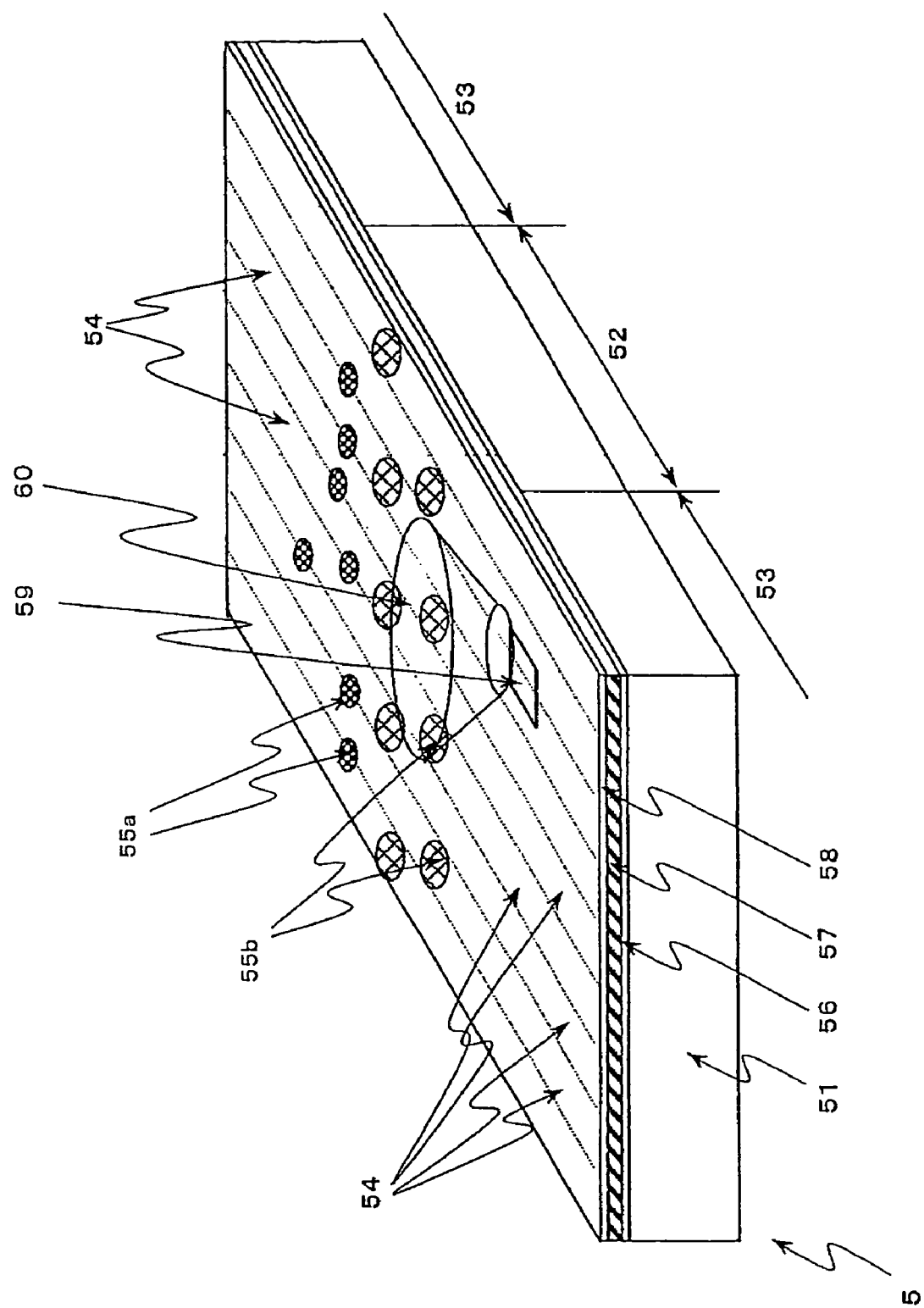
FIG. 5 is a diagram of the structure of the magnetic recording medium in Embodiment 5 of the present invention.

FIG. 5 shows the structure of the magnetic disk 5 in Embodiment 5 of the present invention.

51 is a transparent substrate composed of glass, 56 is a dielectric layer (under layer), 57 is a recording film (magnetic layer group), and 58 is a lubricating protective film that protects the recording film and also serves as a lubricating layer for sliding a magnetic head 59. The magnetic head 59 has an objective lens (not shown) for irradiating the magnetic disk 5 with a laser beam 60. 54 is a recording track, which is constituted by servo-use pit regions 52 and information recording-use data regions 53. In the pit regions 52 are formed tracking servo-use pre-pits 55a and address detection-use pre-pits 55b, which are two kinds of servo-use pre-pits formed by changing the surface roughness to be different from that of the pit regions 52. The track pitch of the magnetic disk 5 is 0.4 μm.

With the above-mentioned magnetic disk 5, signals are recorded and reproduced by the magnetic head 59 by irradiating the recording film 57 with a laser beam from the side on which the lubricating protective film 58 is formed. This is applicable to a magnetic disk that requires the recording and reproduction of recording marks beyond the detection limit of the laser spot during reproduction. Also, the recording film 57 has characteristics such that its coercive force Hc and saturation magnetization Ms decrease as its temperature T rises. During the recording of information, the magnetic disk 5 rotates and recording is performed by the magnetic head 59 by irradiating the disk with a laser spot along the track. Since the coercive force of the recording film 57 decreases at high temperature here, recording with the magnetic head is possible. During signal reproduction, the temperature is raised by irradiation with the laser beam, while the recorded magnetic domains are detected by the magnetic head (such as a GMR head). Here, the saturation magnetization Ms rises along with temperature, reaching its maximum at 100° C., so the detection sensitivity of the magnetic head is enhanced and the reproduction signal is increased.

Next, the method for producing the magnetic disk 5 will be described in detail.

First, a photopolymer is used to form pre-pits on the surface of the substrate 51 composed of transparent glass. These pre-pits are formed in a surface roughness Ra of less than 0.5 nm and in a consistently smoothed shape. The regions other than the pre-pits are etched with an ion gun through a mask to raise the surface roughness Ra to 0.5 nm or more. As a result, servo-use pre-pits are formed whose surface roughness is less than the surface roughness of the other than the signal region.

Next, a ZnS—SiO$_2$ target is placed in a DC magnetron sputtering apparatus, and the substrate 51 is fixed to a substrate holder, after which the chamber is vacuum evacuated with a turbo molecular pump until a high vacuum of $8\times10^{-6}$ Pa or less is attained. While this vacuum evacuation is continued, argon gas is introduced into the chamber until a pressure of 0.2 Pa is reached, and the dielectric layer 56 (an under layer composed of ZnS—SiO$_2$) is formed in a thickness of 10 nm by RF magnetron sputtering while the substrate 51 is rotated. As a result, the pre-pits of the substrate 51 are also formed on the under layer 56.

Then, while vacuum evacuation is continued, argon gas is introduced into the chamber up to 2.0 Pa, and a recording layer 57 of TbFeCo is formed in a thickness of 80 nm by DC magnetron sputtering, using an alloy target of TbFeCo, while the substrate 51 is rotated. The TbFeCo film composition here can be adjusted as desired by adjusting the film formation conditions and the alloy target compositional ratio. The recording film 57 composed of TbFeCo here was produced by adjusting the film composition so that the compensation composition temperature would be −40° C. and the Curie temperature would be 310° C.

Then, argon gas and N$_2$ gas are introduced into the chamber up to 0.3 Pa, and a dielectric layer composed of SiN is formed by reactive sputtering in a thickness of 2 nm while the substrate 51 is rotated. A solid lubricating layer composed of amorphous carbon is then formed over this in a thickness of 2 nm by DC sputtering, using a carbon target, in an argon gas atmosphere. This is then coated with a perfluoropolyether to form a lubricating protective film 58.

As a result, the saturation magnetization Ms increases along with the temperature, reaching its maximum at 120° C., and the film characteristics are such that the coercive force Hc decreases as the temperature rises from room temperature.

Also, with the magnetic disk 5, the saturation magnetization Ms reaches its maximum at 120° C., which is the temperature under laser beam irradiation, and recorded magnetic domains can be formed stably even when tiny magnetic domains are recorded, and recording and reproduction with excellent signal characteristics can be accomplished even in the case of repeatedly conducting recording and reproduction with the magnetic head.

The magnetic disk 5 was described above as having a structure in which the photopolymer surface of the substrate 51 was directly worked by etching, but a method in which pre-pits are formed by transferring the difference in surface roughness of the stamper to a photopolymer, or a method involving transfer to a photopolymer using imprinting or the like, or a method in which the portion other than the pre-pits on the base surface of the substrate is directly etched and the surface roughness is varied, may also be used.

Furthermore, the track pitch was 0.4 μm with this embodiment, but the effect of the present invention is greater with a structure in which information is recorded to a recording domain in which the width of the groove (where information is recorded) is 0.6 μm or less, and the shortest mark length of recorded information is 0.3 μm or less.

As discussed above, with the constitution of this embodiment, stable reproduction signal characteristics are obtained even when high-density recorded information is recorded and reproduced. Furthermore, since the recorded magnetic domains in the information track are formed in a stable shape, there is a reduction in crosswrite and crosstalk from adjacent tracks during recording and reproduction.

Embodiment 6

A problem encountered with a conventional magnetic disk was that the servo characteristics fluctuated or deteriorated as the temperature of the magnetic disk rose when the recording film was irradiated with a laser beam. Another problem was that the recording and reproduction characteristics were adversely affected as the servo signal fluctuated, for example.

In contrast, the magnetic disk 6 configuration is such that servo-use pre-pits (signal region) formed so that the surface roughness is different from that of other than the signal region are formed on the under layer, and the change in magnetic characteristics of the recording layer is detected as a servo reference signal, so the resulting servo characteristics is stable with respect to changes in the environment temperature, and changes in the temperature of the magnetic disk when the recording film is irradiated with the laser beam during recording and reproduction. As a result, a magnetic disk with superior signal characteristics and superior durability can be obtained even when a signal is reproduced using a magnetic head such as a GMR head by raising the temperature of the recording film with a light beam or the like.

Figure 6:
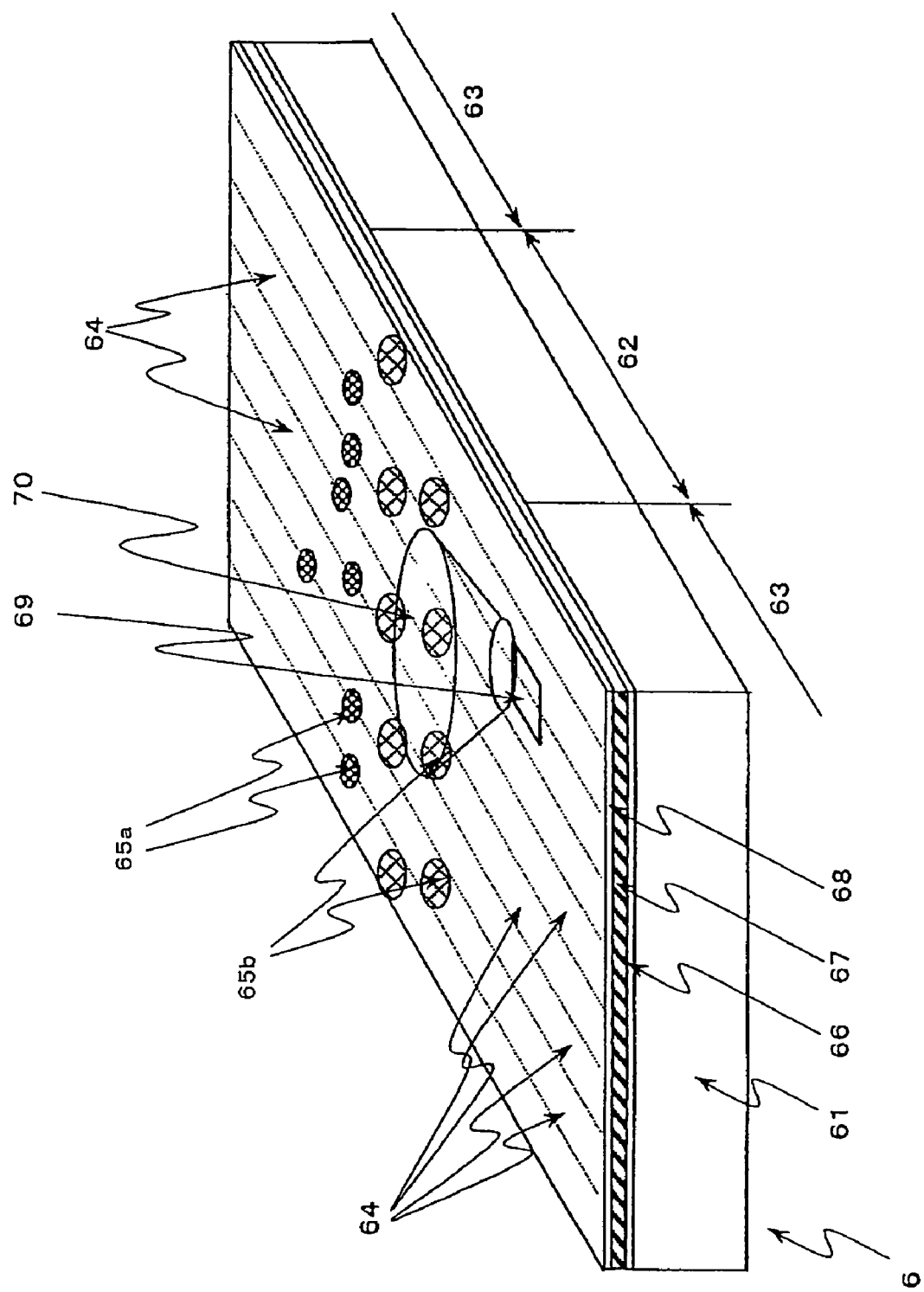
FIG. 6 is a diagram of the structure of the magnetic recording medium in Embodiment 6 of the present invention.

FIG. 6 shows the structure of the magnetic disk 6 in Embodiment 6 of the present invention.

61 is a transparent substrate composed of glass, 66 is a dielectric layer (under layer), 67 is a recording film (magnetic layer group), and 68 is a lubricating protective film that protects the recording film and also serves as a lubricating layer for sliding a magnetic head 69. The magnetic head 69 has an objective lens (not shown) for irradiating the magnetic disk 6 with a laser beam 70. 64 is a recording track, which is constituted by servo-use pit regions 62 and information recording-use data regions 63. In the pit regions 62 are formed tracking servo-use pre-pits 65a and address detection-use pre-pits 65b, which are two kinds of servo-use pre-pits formed by changing the surface roughness to be different from that of the pit regions 62. The track pitch of the magnetic disk 6 is 0.35 μm.

With the above-mentioned magnetic disk 6, signals are recorded and reproduced by the magnetic head 69 by irradiating the recording film 67 with a laser beam from the side on which the lubricating protective film 68 is formed. This is applicable to a magnetic disk that requires the recording and reproduction of recording marks beyond the detection limit of the laser spot during reproduction. Also, the recording film 67 has characteristics such that its coercive force Hc and saturation magnetization Ms decrease as its temperature T rises. During the recording of information, the magnetic disk 6 rotates and recording is performed by the magnetic head 69 by irradiating the disk with a laser spot along the track. Since the coercive force of the recording film 67 decreases at high temperature here, recording with the magnetic head is possible. During signal reproduction, the temperature is raised by irradiation with the laser beam, while the recorded magnetic domains are detected by the magnetic head (such as a GMR head). Here, the saturation magnetization Ms rises along with temperature, reaching its maximum at 100° C., so the detection sensitivity of the magnetic head is enhanced and the reproduction signal is increased.

Next, the method for producing the magnetic disk 6 will be described in detail.

First, the surface of a stamper produced by coating a glass base with a photoresist is etched with an ion gun through a pitted mask, which raises the surface roughness Ra to at least 0.7 nm. Then, just as with the manufacturing method illustrated in FIG. 7, this stamper is pressed against the substrate 61 composed of transparent glass to transfer the pit pattern and form pre-pits on the substrate 61.

Next, an AgCu target is placed in a. DC magnetron sputtering apparatus, and the substrate 61 in which the pre-pits have been formed is fixed to a substrate holder, after which the chamber is vacuum evacuated with a turbo molecular pump until a high vacuum of $8\times10^{-6}$ Pa or less is attained. While this vacuum evacuation is continued, argon gas is introduced into the chamber until a pressure of 0.4 Pa is reached, and the dielectric layer 66 (a metal under layer composed of AgCu) is formed in a thickness of 6 nm by DC magnetron sputtering while the substrate 61 is rotated. As a result, the pre-pits of the substrate 61 are also formed on the surface of the under layer 66.

Then, while vacuum evacuation is continued, argon gas is introduced into the chamber up to 1.8 Pa, and a recording layer 67 of TbFeCo is formed in a thickness of 50 nm by DC magnetron sputtering, using an alloy target of TbFeCo, while the substrate 61 is rotated.

The TbFeCo film composition here can be adjusted as desired by adjusting the film formation conditions and the alloy target compositional ratio. The recording film 67 composed of TbFeCo here was produced by adjusting the film composition so that the compensation composition temperature would be −70° C. and the Curie temperature would be 320° C. As a result, the saturation magnetization Ms increases along with the temperature, reaching its maximum at 110° C., and the film characteristics are such that the coercive force Hc decreases as the temperature rises from room temperature. Therefore, with the magnetic disk 6 of this embodiment, the saturation magnetization Ms reaches its maximum at 110° C., which is the temperature under laser beam irradiation, and recorded magnetic domains can be formed stably even when tiny magnetic domains are recorded, and recording and reproduction with excellent signal characteristics can be accomplished even in the case of repeatedly conducting recording and reproduction with the magnetic head 69.

Then, argon gas and $N_2$ gas are introduced into the chamber up to 0.3 Pa, and a dielectric layer composed of SiN is formed by reactive sputtering in a thickness of 2 nm while the substrate 61 is rotated. A solid layer composed of diamond-like carbon is then formed over this in a thickness of 3 nm by plasma CVD, using a carbon target, in a mixed atmosphere of argon and $CH_4$. The protective layer surface is etched at this point to bring the surface roughness Ra to at least 0.7 nm. This is then coated with a perfluoropolyether to form a lubricating protective film 68.

Thus, with the constitution of this embodiment, in which a concave-convex pattern with high surface roughness is formed on the surface of the lubricating protective layer, the magnetic head is prevented from sticking to the lubricating protective layer surface, and a lubricating protective layer can be formed with excellent magnetic head sliding characteristics and float characteristics.

The magnetic disk 6 was described above as having a structure in which the pattern was transferred to the substrate using a stamper produced by directly working a photoresist base by etching, but a structure in which the pre-pits are formed by a photopolymer, or a method involving direct working of the substrate, for example, may be used, or the base surface of the substrate may be directly etched and the pre-pits worked directly.

Furthermore, the track pitch was 0.4 μm with the magnetic disk 6, but the effect of the present invention is greater with a magnetic disk in which information is recorded to a recording domain in which the width of the groove (where information is recorded) is 0.6 μm or less, and the shortest mark length of recorded information is 0.3 μm or less.

As discussed above, with the constitution of this embodiment, stable reproduction signal characteristics are obtained even when high-density recorded information is recorded and reproduced. Furthermore, since the recorded magnetic domains in the information track are formed in a stable shape, there is a reduction in crosswrite and crosstalk from adjacent tracks during recording and reproduction.

Embodiment 7

Figure 8:
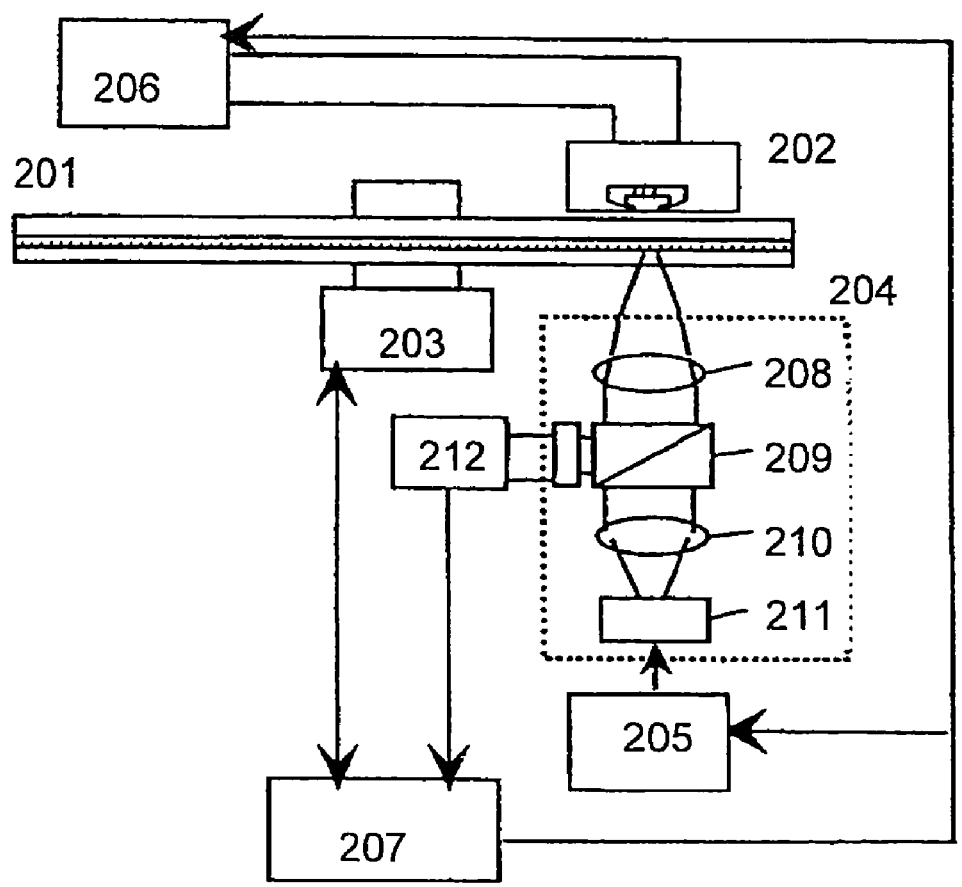
FIG. 8 is a diagram of the apparatus used for recording and reproduction with the magnetic recording medium in an embodiment of the present invention.

The magnetic disk recording and reproduction apparatus of the present invention will now be described. FIG. 8 shows the structure of a recording and reproduction apparatus.

Signals are recorded to and reproduced from a magnetic disk 201 attached to a spindle motor 203, by a magnetic head 202 controlled by a magnetic head control detection circuit 206. An optical head 204 irradiates the disk with a laser beam controlled by a laser drive circuit 205, while recording and reproduction are performed by the magnetic head. Here, rotational drive control of the motor, servo control of the laser beam, and so forth are performed by a motor drive and control circuit 207. The reflected light of the optical head is detected by a photodetector 212 and utilized in focusing servo control and tracking servo control.

Using a recording and reproduction apparatus configured as above, information is recorded to and reproduced from the magnetic disk of the present invention while a tracking servo is controlled according to pre-pits of different surface roughness.

Here, the magnetic disk 201 of this embodiment is a magnetic disk in which pre-pits of different surface roughness are formed, the tracking servo and address detection is performed by means of signals from the pre-pits, and a servo signal is recorded on the disk using the pre-pits as a reference signal, thereby formatting the magnetic disk.

The optical head 204 has optical elements 208, 209, 210, and 211. The configuration described here has the optical head 204 disposed in the opposite direction from that of the magnetic head, but as shown in Embodiments 2, 5, and 6, the constitution may be such that irradiation is from the same side as the magnetic head.

As discussed above, when the recording and reproduction apparatus of this embodiment is used, stable servo reference signals can be detected and excellent recording and reproduction signal characteristics can be obtained even with high-density recording and reproduction. Furthermore, since the recorded magnetic domains in the information track are formed in a stable shape, there is a reduction in crosswrite and crosstalk from adjacent tracks during recording and reproduction.

Other Embodiments

The structure described above was one in which a plurality of regions were formed such that the surface roughness was different from that of the other than the signal region by a method involving transfer by imprinting or the like via a stamper or the like, or by direct etching, but the present invention is not limited to this method, and pre-pits may instead be produced by forming a plurality of regions of different surface roughness.

The above description was of a substrate in which the track pitch of the recording track of the substrate was from 0.25 to 0.4 μm, but the structure may be one in which information is recorded to a recording domain in which the width of the groove (where information is recorded) is 0.6 μm or less, and the shortest mark length of recorded information is 0.3 μm or less. The effect of the present invention is greater with a smaller recording track and lower linear recording density.

There is no limit to the depth of the pre-pits in the above embodiments, but preferably the pre-pit depth is from 10 to 200 nm, and the effect is the same as or better than that of the present invention if signals from tracking servo pre-pits, address detection pre-pits, and so forth can be detected with the magnetic head.

The magnetic disk may be configured such that a heat absorbent layer with a high coefficient of thermal conductivity is formed between the substrate and the dielectric under layer, and a layer with a low coefficient of thermal conductivity is further formed, thereby controlling the thermal conduction and temperature distribution within the disk.

The recording film was described above as having a single-layer structure or a multilayer structure that featured magnetically super-resolution, but may be configured such that laminated magnetic recording films having a recording layer in which recording information is kept. Also, the films may include a recording layer and a reproduction layer to increase signal quantity, and the two layers may be alternately coupled magnetically.

The material of the recording layer was described above for a recording layer composed of TbFeCo, but may be a magnetic layer in which a rare earth metal-transition metal alloy is used, and may be a magnetic thin film containing a material such as terbium, gadolinium, dysprosium, neodymium, or holmium, and a transition metal such as iron, cobalt, or nickel.

The material of the reproduction layer was described above for a reproduction layer composed of GdFeCoCr, but may be GdFeCoAl or another material composition, or may comprise a laminate of these materials.

The corrosion resistance of the magnetic film included in the magnetic layer group of the recording layer, reproduction layer, and so forth may be improved by adding chromium, copper, titanium, tantalum, silver, gold, platinum, or another such material.

A transition metal of terbium, iron, or cobalt may be laminated in a periodic structure by controlling the film formation rate and the substrate rotation speed during the production of the TbFeCo recording layer. If the lamination period here is 2.0 nm or less, the product Ms·Hc of the saturation magnetization Ms and coercive force Hc of the recording layer can be increased. Actually, with a recording layer having a lamination period of 1.0 nm, a large Ms·Hc value of $10^6$ erg/cm$^3$ was obtained. Stable recording magnetic domains can still be formed even when tiny magnetic domains of 50 nm or less are recorded, and recording and reproduction with superior signal characteristics can be accomplished even in repeated recording and reproduction.

The recording layer is not limited to a periodic laminated structure of terbium and FeCo in a period of 2.0 nm or less, and the same effect is obtained with a structure in which the lamination period is at least 0.3 nm and no more than 4 nm, and with a structure in which the thickness of the recording layer is at least 20 nm, and preferably from 40 to 200 nm.

With this embodiment, the transition metals of terbium, iron, and cobalt are not limited to a periodic lamination structure, and different targets of terbium, iron, and cobalt may be used, or other materials may be included, or the recording layer may have a lamination period of 2 nm or less.

The Curie temperature of the recording layer composed of TbFeCo was set to be 290° C. and 320° C., but may be set to a temperature of at least 150° C. according to the conditions under which the temperature is raised with the optical head and the characteristics of the magnetic head, as well as the permissible range of environment temperature.

With the recording layer manufacturing method, the microstructure of the films of terbium, iron, and cobalt can be varied by controlling the rotational speed of the substrate and the film formation conditions during the formation of the TbFeCo recording layer, and a magnetic thin film having an amorphous film structure with high magnetic anisotropy may be used. More specifically, during the production of the TbFeCo recording layer, the above-mentioned film structure can be formed by forming films of the various element particles at a film formation rate of 0.5 nm/sec while rotating at 40 rpm.

As discussed above, with the constitution of this embodiment, the recorded information of a recording layer can be stably detected by a magnetic head even when using a three-layer recording film consisting of a recording layer, an intermediate layer, and a reproduction layer, and stably reproduction signal characteristics can be obtained even in high-density recording and reproduction.

As a result of the above, with the present invention, a lubricating layer is formed via a heat isolating layer in a recording film produced by the successive lamination of a recording layer capable of rewriting recorded information, an intermediate layer, and a reproduction layer, and as a result of this configuration, tiny magnetic domains of 0.3 μm or less can be stably formed at a track pitch of 0.6 μm or less, and it is possible to increase the reproduction signal transferred to the reproduction layer. Furthermore, since the recorded magnetic domains in the information track are formed in a stable shape, there is a reduction in crosswrite and crosstalk from adjacent tracks during recording and reproduction.

With a magnetic disk employing magnetically super-resolution in which DWDD technology is used, the film structure thereof was described above as being formed from a reproduction layer, an intermediate layer, and a recording layer, but the magnetic disk is not limited to this structure, and may have a RAD (Rear Aperture Detection), FAD (Front Aperture Detection), or CAD (Center Aperture Detection) structure, or may employ double-mask magnetically super-resolution, or MAMMOS (Magnetic Amplifying Magneto-Optical System), or another such film structure in which transferred magnetic domains are expanded and reproduced.

The recording film structure is not limited to a three-layer structure consisting of a recording layer, an intermediate layer, and a reproduction layer, and may be a structure in which a multilayer film having the required functions is formed.

With this embodiment, a manufacturing method was described in which the recording layer was sputtered in an argon gas atmosphere, but neon, krypton, xenon, or another inert gas may be used instead. $H_2$ or the like may also be contained in these atmosphere gases.

With the magnetic disk of this embodiment, a substrate in which pre-pits of different surface roughness was described, but the structure may instead be such that the substrate has grooves or lands that separate the recording tracks. With this structure, the tracks in which information is recorded are magnetically cut off, and the magnetic walls of the recorded magnetic domains transferred to the reproduction layer are readily shifted, and with the above-mentioned DWDD technology, a magnetic disk with superior signal characteristics can be obtained. Also, the concave/convex grooves or lands facilitate separation of the recording tracks, and as a result, tiny magnetic domains of 0.1 μm or less are formed stably, the mobility of the magnetic walls of the transferred magnetic domains by DWDD can be ensured, and a magnetic disk with superior reproduction signal characteristics can be obtained. Furthermore, crosswrite and crosstalk from adjacent tracks during recording and reproduction can also be reduced.

The material of the substrate was described above as being glass or metal, but as long as there are no problems with the material characteristics, a plastic or other such material may be used instead.

The dielectric layer (under layer) was described above as being SiN, AlTiN, ZnS—$SiO_2$, $TaO_x$, AlTi, or AgCu on the substrate, but may instead be an oxide or chromium, titanium, tantalum, or another material, or a nitride, or a chalcogen compound or other such II-VI or III-V compound, or a metal material such as aluminum, copper, silver, gold, or platinum, or a mixed material containing these.

The above materials may also be used as protective film materials.

The protective layer was described above as being formed by a method in which a solid lubricating layer composed of diamond-like carbon is formed by reactive RF sputtering, using a carbon target, in a mixed atmosphere of argon and $CH_4$, or a method in which a solid lubricating layer composed of amorphous carbon is formed by DC sputtering, using a carbon target, in an argon atmosphere, but if a diamond-like carbon film is formed by CVD or the like, an even more solid film can be formed.

The protective layer may be formed by a method in which a resin composed of an epoxyacrylate, or a urethane resin, is used to produce a uniform coating of about 5 μm by spin coating, and this coating is solidified by being irradiated with a UV lamp.

Furthermore, a structure involving coating with a lubricating protective layer composed of a perfluoropolyether was described above, but spin coating, dipping, or another such method may be used instead.

The magnetic disk of the present invention may further be subjected to tape burnishing to remove any foreign matter, protrusions, or the like without scratching the surface, and a uniform coating is applied from the inner periphery to the outer peripheral edge in a good film thickness distribution (distribution of the protective coating) of ±5% or less.

The substrate may also be a double-sided type. In this case, tracking servo pre-pits must be formed on both sides, and the recording layer and protective layer must also be formed on both sides. With a recording and reproduction apparatus, the drive structure must be such that a magnetic head is attached to both sides of a recording film including a recording layer. Further, after the films are formed on both sides, the medium surface is placed in a tape burnishing apparatus, and tape burnishing is performed on both sides, from the inner periphery toward the outer periphery, while the medium is rotating, which removes foreign matter, protrusions, or the like.

The changes in the magnetic characteristics in the above embodiments are the changes to the magnetic characteristics of the recording film that accompany changes in the substrate or the under layer, and the same effect as in the present invention is obtained if these are changes to the magnetic characteristics that can be detected by a magnetic head, including coercive force, saturation magnetization, flux density, magnetic anisotropy, the temperature dependence of these, and so forth.

INDUSTRIAL APPLICABILITY

The magnetic recording medium of the present invention allows information to be recorded at high density, and as such is useful as an information storage device or memory medium.

The invention claimed is:

1. A magnetic recording medium having a recording layer on a substrate,
   comprising at least one signal region on the substrate,
   wherein a surface roughness of the signal region is different from that of other than the signal region, and
   wherein the signal region has pre-pits that serve as a reference for a tracking servo of a recording and reproduction magnetic head.

2. The magnetic recording medium according to claim 1, wherein the signal region has a concave or convex shape.

3. The magnetic recording medium according to claim 1, wherein the signal region comprises pre-pits having a surface roughness Ra of 0.5 nm or more, and the surface roughness of the other than the signal region is constant and less than 0.5 nm.

4. The magnetic recording medium according to claim 1, wherein the signal region comprises pre-pits having a surface roughness Ra of at least 0.5 nm or less, and the surface roughness of the other than the signal region is constant and more than 0.5 nm.

5. The magnetic recording medium according to claim 1, wherein the recording layer is composed of a magnetic film having magnetic anisotropy in the direction perpendicular to the film plane.

6. The magnetic recording medium according to claim 1, wherein the pre-pits that serve as a reference for the tracking servo of the recording and reproduction magnetic head have a concave/convex pattern that is smaller than the smallest pattern in the recording magnetic domain formed in the recording layer.

7. The magnetic recording medium according to claim 1, wherein the maximum diameter of the signal region is 0.5 μm or less.

8. A magnetic recording medium having a recording layer on a substrate, comprising:
   an under layer on the substrate; and
   at least one signal region on the under layer, wherein a surface roughness of the signal region is different from that of other than the signal region; and wherein the signal region has pre-pits that serve as a reference for a tracking servo of a recording and reproduction magnetic head.

9. The magnetic recording medium according to claim 8, wherein the under layer is composed of a dielectric layer, a metal layer, or a magnetic layer, or a thin film laminated thereof.

10. The magnetic recording medium according to claim 8, wherein the signal region has a concave or convex shape.

11. The magnetic recording medium according to claim 8, wherein the signal region comprises pre-pits having a surface roughness Ra of 0.5 nm or more, and the surface roughness of the other than the signal region is constant and less than 0.5 nm.

12. The magnetic recording medium according to claim 8, wherein the signal region comprises pre-pits having a surface roughness Ra of 0.5 nm or less, and the surface roughness of the other than the signal region is constant and more than 0.5 nm.

13. The magnetic recording medium according to claim 8, wherein the recording layer is composed of a magnetic film having magnetic anisotropy in the direction perpendicular to the film plane.

14. The magnetic recording medium according to claim 8, wherein the pre-pits that serve as a reference for the tracking servo of the recording and reproduction magnetic head have a concave/convex pattern that is smaller than the smallest pattern in the recording magnetic domain formed in the recording layer.

15. The magnetic recording medium according to claim 8, wherein the maximum diameter of the signal region is 0.5 μm or less.

16. A magnetic recording medium having a recording layer on a substrate,
comprising at least one signal region on the substrate,
wherein a surface roughness of the signal region is different from that of other than the signal region;
wherein the signal region has a concave or convex shape; and
wherein microparticles are packed in the signal region.

17. The magnetic recording medium according to claim 16, wherein the microparticles are a self-organizing organic compound.

18. A magnetic recording medium having a recording layer on a substrate,
comprising at least one signal region on the substrate,
wherein a surface roughness of the signal region is different from that of other than the signal region,
wherein the recording layer is composed of a magnetic film having magnetic anisotropy in the direction perpendicular to the film plane, and
wherein a reproduction layer, to which a recording magnetic domain formed on the recording layer is transferred, and to which the magnetic wall of the transferred recording magnetic domain moves during the reproduction of recorded information, is further provided over the recording layer.

19. A magnetic recording medium having a recording layer on a substrate, comprising:
an under layer on the substrate; and
at least one signal region on the under layer,
wherein a surface roughness of the signal region is different from that of other than the signal region, and
wherein microparticles are packed in the signal region.

20. The magnetic recording medium according to claim 19, wherein the microparticles are a self-organizing organic compound.

21. A magnetic recording medium having a recording layer on a substrate, comprising:
an under layer on the substrate; and
at least one signal region on the under layer,
wherein a surface roughness of the signal region is different from that of other than the signal region,
wherein the recording layer is composed of a magnetic film having magnetic anisotropy in the direction perpendicular to the film plane, and
wherein a reproduction layer, to which a recording magnetic domain formed on the recording layer is transferred, and to which the magnetic wall of the transferred recording magnetic domain moves during the reproduction of recorded information, is further provided over the recording layer.

* * * * *